United States Patent
Lee et al.

(10) Patent No.: US 12,015,803 B2
(45) Date of Patent: Jun. 18, 2024

(54) CAMERA MODULE, IMAGE PROCESSING DEVICE AND IMAGE COMPRESSION METHOD

(71) Applicant: SAMSUNG ELECTRONICS CO., LTD., Suwon-si (KR)

(72) Inventors: Wonseok Lee, Suwon-si (KR); Seongwook Song, Seoul (KR); Yunseok Choi, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/150,046

(22) Filed: Jan. 4, 2023

(65) Prior Publication Data
US 2023/0164362 A1 May 25, 2023

Related U.S. Application Data

(63) Continuation of application No. 17/236,458, filed on Apr. 21, 2021, now Pat. No. 11,570,479.

(30) Foreign Application Priority Data

Apr. 24, 2020 (KR) .................. 10-2020-0050355
Feb. 1, 2021 (KR) .................. 10-2021-0014395

(51) Int. Cl.
*H04N 19/85* (2014.01)
*H04N 19/182* (2014.01)
(Continued)

(52) U.S. Cl.
CPC .......... *H04N 19/85* (2014.11); *H04N 19/182* (2014.11); *H04N 19/184* (2014.11); *H04N 19/186* (2014.11); *H04N 19/42* (2014.11)

(58) Field of Classification Search
CPC .... H04N 19/85; H04N 19/182; H04N 19/184; H04N 19/186; H04N 19/42;
(Continued)

(56) References Cited

U.S. PATENT DOCUMENTS 8,018,499 B2  9/2011 Noh
8,872,931 B2  10/2014 Roh et al.
(Continued)

FOREIGN PATENT DOCUMENTS

CA   3119646 A1 * 7/2020 ........... H04N 19/117
JP   5520890 B2   6/2014
(Continued)

*Primary Examiner* — Tracy Y. Li
(74) *Attorney, Agent, or Firm* — Sughrue Mion, PLLC

(57) ABSTRACT

A camera module includes a compressor configured to divide a plurality of pixels included in image data, into a plurality of pixel groups, with respect to each of the plurality of pixel groups into which the plurality of pixels is divided, calculate a representative pixel value of a corresponding pixel group, based on pixel values of multiple pixels included in the corresponding pixel group, generate first compressed data, based on the calculated representative pixel value of each of the plurality of pixel groups, with respect to each of the plurality of pixel groups into which the plurality of pixels is divided, calculate residual values representing differences between the pixel values of the multiple pixels included in the corresponding pixel group and the representative pixel value of the corresponding pixel group, and generate second compressed data, based on the calculated residual values of each of the plurality of pixel groups.

20 Claims, 27 Drawing Sheets

(51) Int. Cl.
*H04N 19/184* (2014.01)
*H04N 19/186* (2014.01)
*H04N 19/42* (2014.01)

(58) Field of Classification Search
CPC ...... H04N 19/593; H04N 19/59; H04N 19/80; H04N 9/646; H04N 23/45; G06T 3/4053
See application file for complete search history.

(56) References Cited

U.S. PATENT DOCUMENTS

| | | |
|---|---|---|
| 10,440,360 B2 | 10/2019 | Edsoe et al. |
| 10,904,436 B2 | 1/2021 | Heo et al. |
| 2014/0105279 A1* | 4/2014 | Hattori ................ H04N 19/137 375/240.03 |
| 2016/0014422 A1* | 1/2016 | Su ...................... H04N 19/124 375/240.03 |
| 2018/0199032 A1* | 7/2018 | Thoreau ................ H04N 19/36 |
| 2020/0059642 A1* | 2/2020 | Kang ................... H04N 19/176 |

FOREIGN PATENT DOCUMENTS

| | | |
|---|---|---|
| KR | 10-2008-0041857 A | 5/2008 |
| KR | 10-2019-0054288 A | 5/2019 |
| KR | 10-2019-0092757 A | 8/2019 |

\* cited by examiner

FIG. 2A
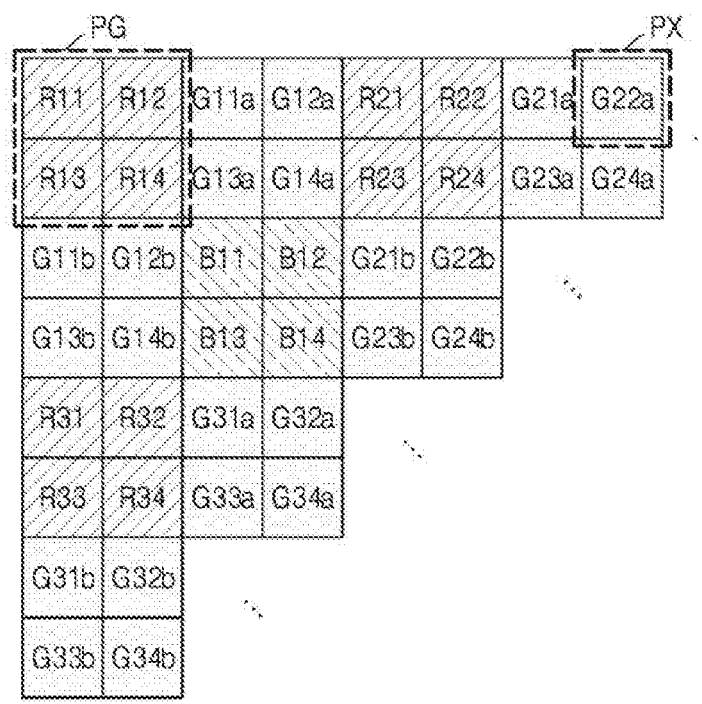
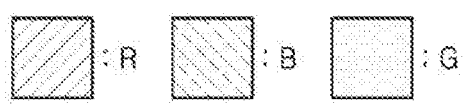

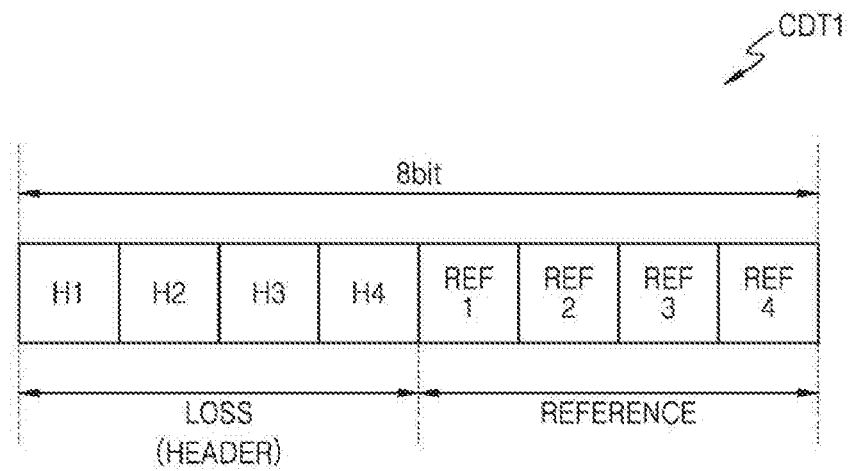

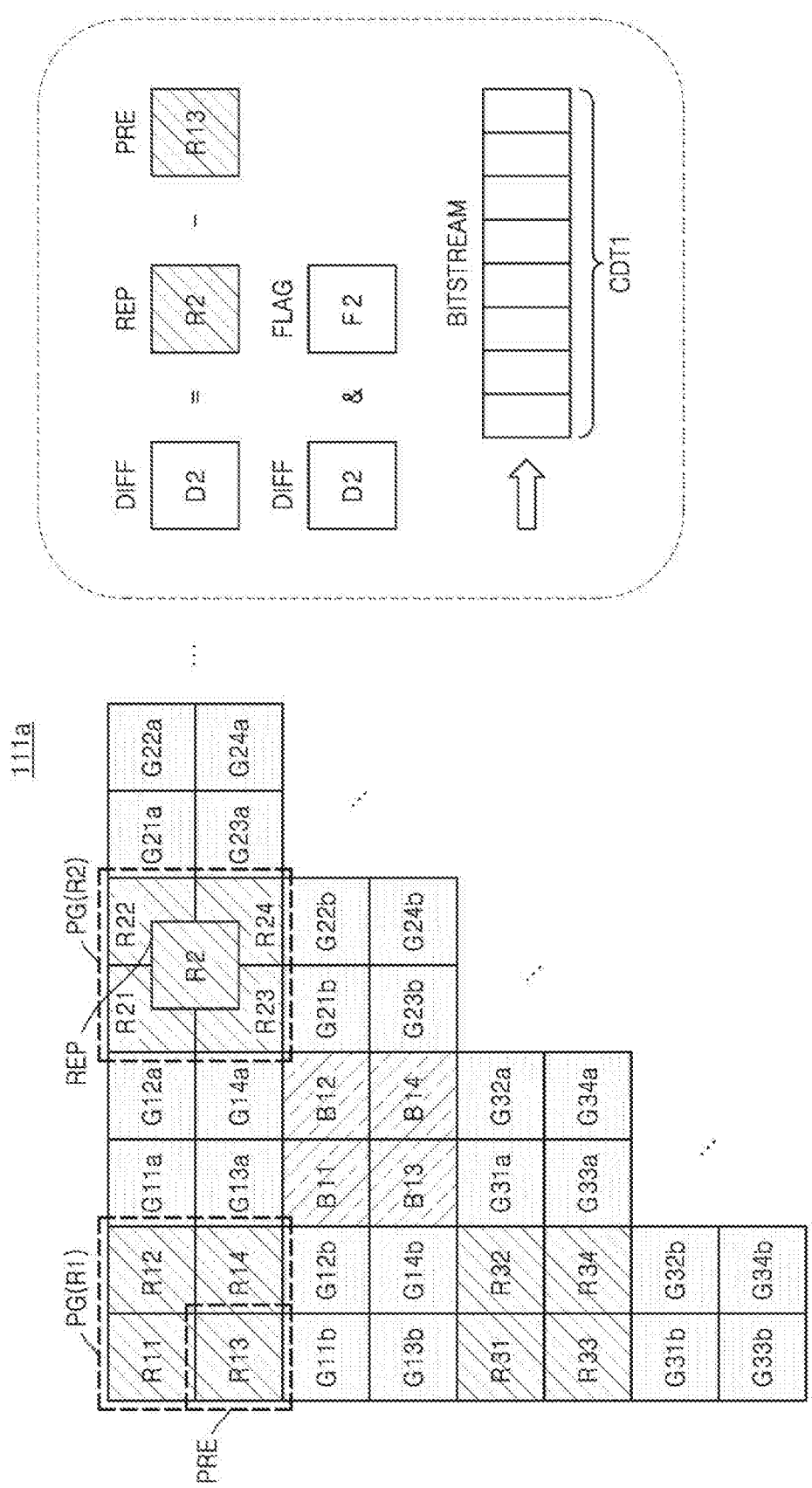

CAMERA MODULE, IMAGE PROCESSING DEVICE AND IMAGE COMPRESSION METHOD

CROSS-REFERENCE TO RELATED APPLICATIONS

This application is a Continuation of U.S. application Ser. No. 17/236,458, filed Apr. 21, 2021, with is based on and claims priority under 35 U.S.C. § 119 to Korean Patent Application Nos. 10-2020-0050355 and 10-2021-0014395, filed on Apr. 24, 2020, and Feb. 1, 2021, in the Korean Intellectual Property Office, the disclosures of which are incorporated by reference herein in their entireties.

BACKGROUND

The disclosure relates to a camera module, an image processing device, and an image compression method, and more particularly, to a camera module, an image processing device, and an image compression method using multi resolution compressed data.

Image compression may refer to a process of generating compressed image data having a size smaller than that of original image data, based on the original image data. Also, image decompression may refer to a process of generating reconstructed image data by decompressing the compressed image data. The reconstructed image data may be the same as or different from the original image data, according to a compression method and a decompression method. For example, the reconstructed image data may include preview image data having a lower resolution than that of the original image data, and full resolution image data having the same resolution as that of the original image data.

SUMMARY

Provided are a camera module for generating and using compressed data used to generate images having a plurality of resolutions, an image processing device, and an image compression method.

Additional aspects will be set forth in part in the description that follows and, in part, will be apparent from the description, or may be learned by practice of the presented embodiments.

According to embodiments, there is provided a camera module including an image sensor configured to generate image data including a plurality of pixels, and a compressor configured to divide the plurality of pixels included in the generated image data, into a plurality of pixel groups, with respect to each of the plurality of pixel groups into which the plurality of pixels is divided, calculate a representative pixel value of a corresponding pixel group, based on pixel values of multiple pixels included in the corresponding pixel group, generate first compressed data, based on the calculated representative pixel value of each of the plurality of pixel groups, with respect to each of the plurality of pixel groups into which the plurality of pixels is divided, calculate residual values representing differences between the pixel values of the multiple pixels included in the corresponding pixel group and the representative pixel value of the corresponding pixel group, and generate second compressed data, based on the calculated residual values of each of the plurality of pixel groups. The camera module further includes an interface configured to output the generated first compressed data and the generated second compressed data.

According to embodiments, there is provided an image processing device including an interface configured to receive compressed data that is obtained by compressing image data including a plurality of pixel groups, in units of a pixel group, and a memory storing the received compressed data. The image processing device further includes a decompressor configured to decompress at least a part of the stored compressed data to generate decompressed data, and an image signal processor configured to perform image processing, based on the generated decompressed data, to generate reconstructed image data. The reconstructed image data includes first image data having a first resolution and second image data having a second resolution, and the compressed data includes first compressed data that is used to generate the first image data and the second image data, and second compressed data that is used to generate the second image data.

According to embodiments, there is provided an image compression method with respect to image data including a plurality of pixel groups, the image compression method including, with respect to each of the plurality of pixel groups, calculating a representative pixel value of a corresponding pixel group, based on pixel values of multiple pixels included in the corresponding pixel group, and generating first compressed data, based on the calculated representative pixel value of each of the plurality of pixel groups. The image compression method further includes, with respect to each of the plurality of pixel groups, calculating residual values representing differences between the pixel values of the multiple pixels included in the corresponding pixel group and the representative pixel value of the corresponding pixel group, and generating second compressed data, based on the calculated residual values of each of the plurality of pixel groups.

BRIEF DESCRIPTION OF THE DRAWINGS

The above and other aspects, features, and advantages of embodiments of the disclosure will be more apparent from the following description taken in conjunction with the accompanying drawings, in which:

FIGS. 2A and 2B are diagrams illustrating pixel arrays according to embodiments;

FIG. 7 is a diagram illustrating a configuration of first compressed data according to embodiments;

FIG. 8 is a diagram illustrating a method of calculating a loss value and a reference value of first compressed data, according to embodiments;

FIG. 9 is a diagram illustrating a method of generating first compressed data using a representative pixel value, according to embodiments;

DETAILED DESCRIPTION

Figure 1:
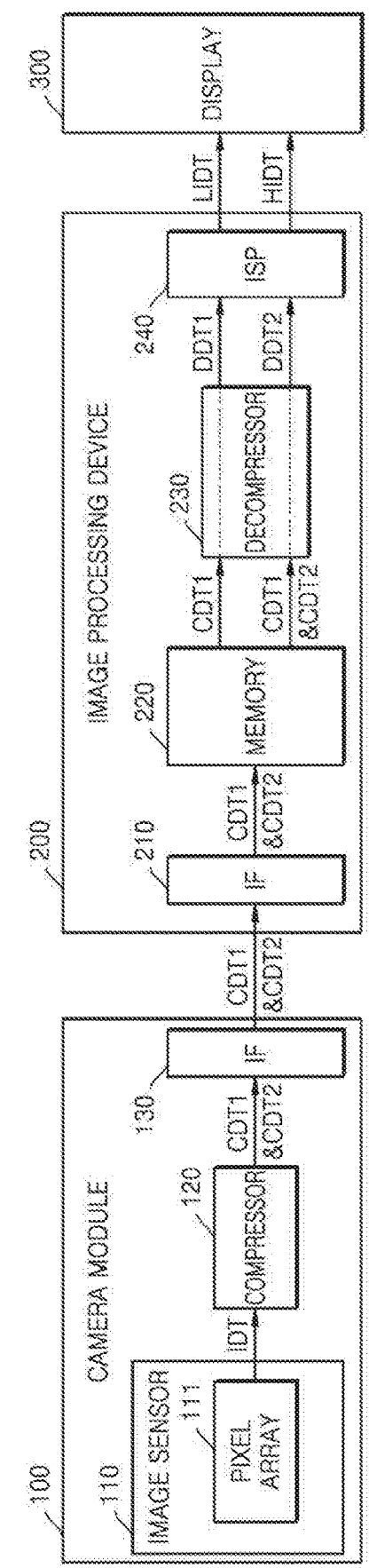
FIG. 1 is a diagram illustrating an image processing system according to embodiments.

FIG. 1 is a diagram illustrating an image processing system 10 according to embodiments.

Referring to FIG. 1, the image processing system 10 may include a camera module 100, an image processing device 200, and a display 300. In an embodiment, the camera module 100 may include an image sensor 110, a compressor 120, and an interface (IF) 130. In an embodiment, the image processing device 200 may include an interface (IF) 210, a memory 220, a decompressor 230, and an image signal processor (ISP) 240.

For example, the image processing system 10 may be implemented as a personal computer (PC), an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc. In addition, the image processing system 10 may be mounted on an electronic device such as a drone, an advanced driver assistance system (ADAS), etc., or an electronic device provided as parts for a vehicle, furniture, manufacturing facilities, doors, various measuring devices, etc.

The camera module 100 may photograph an external subject (or object) and generate image data IDT. For example, the camera module 100 may include the image sensor 110 for converting an optical signal of a subject into an electrical signal. The image sensor 110 may include a plurality of pixels arranged two-dimensionally and may include a pixel array 111. One of a plurality of reference colors may be assigned to each of the plurality of pixels. For example, the plurality of reference colors may include red, green, and blue (RGB) or red, green, blue, and white (RGBW).

As a non-limiting example, the image sensor 110 may be implemented using a charge-coupled device (CCD) image sensor or a complementary metal-oxide-semiconductor (CMOS) image sensor, and may be implemented as various types of photoelectric devices. In some embodiments, the image sensor 110 may output the image data IDT in which pre-processing (e.g., correction of a defective pixel) has been performed on a pixel signal generated by the pixel array 111.

In an embodiment, the camera module 100 may compress the image data IDT using the compressor 120 to reduce power consumption according to data transmission and to increase the efficiency of a data storage space. The compressor 120 may receive the image data IDT from the image sensor 110 and compress the image data IDT to generate compressed data.

The compressor 120 may generate first compressed data CDT1 and second compressed data CDT2 used to generate images having different resolutions based on the image data IDT. For example, the compressor 120 may generate the first compressed data CDT1 used to generate both a first image having a first resolution and a second image having a second resolution. In addition, the compressor 120 may generate the second compressed data CDT2 used to generate the second image. The second resolution may be greater than the first resolution. In some embodiments, the second resolution may be the same as the resolution of the image data IDT generated by the camera module 100.

In some embodiments, the first image having the first resolution may be referred to as a low resolution image or a preview image, and the second image having the second resolution may be referred to as a high resolution image or a full resolution image. In the present specification, the first image is referred to as a low resolution image and the second image is referred to as a high resolution image for ease of understanding, but the embodiments are not limited thereto.

The compressor 120 may calculate representative pixel values of a plurality of pixel groups constituting the image data IDT, and may generate the first compressed data CDT1 based on the calculated representative pixel values. In addition, the compressor 120 may generate the second compressed data CDT2 based on the image data IDT and representative pixel values. The first compressed data CDT1 and the second compressed data CDT2 may be implemented in the form of a bitstream.

The compressor 120 may provide the generated first compressed data CDT1 and second compressed data CDT2 to the image processing device 200 through the interface 130. For example, the interface 130 may be implemented as a camera serial interface (CSI) based on a Mobile Industry Processor Interface (MIPI). However, the type of the interface 130 is not limited thereto, and may be implemented according to various protocol standards.

The image processing device 200 may convert image data received from the camera module 100 to generate the image data to be displayed on the display 300. The image processing device 200 may receive the first compressed data CDT1 and the second compressed data CDT2 from the camera module 100, and perform an image processing operation based on any one or any combination of the first compressed data CDT1 and the second compressed data CDT2 to generate image data. Here, the image data may include low resolution image data LIDT and high resolution image data HIDT.

In some embodiments, the image processing device 200 may generate the low resolution image data LIDT based on the first compressed data CDT1, or may generate the high resolution image data HIDT based on the first compressed data CDT1 and the second compressed data CDT2. The image processing device 200 may receive the first compressed data CDT1 and the second compressed data CDT2 from the camera module 100 through the interface 210. The interface 210 may be implemented as an MIPI, like the interface 130, but is not limited thereto. The image processing device 200 may store the received first compressed data CDT1 and second compressed data CDT2 in the memory 220.

The memory 220 is a storage storing data, and may store, for example, an operating system (OS), various programs, and various data (e.g., image data). The memory 220 may be a volatile memory such as dynamic random access memory (DRAM) or static RAM (SRAM), or a non-volatile memory such as phase change RAM (PRAM), resistive RAM (ReRAM), or flash memory.

When the image processing device 200 receives a request for a low resolution image, the decompressor 230 may read the first compressed data CDT1 from the memory 220 and decompress the first compressed data CDT1 to generate first decompressed data DDT1. In addition, when the image processing device 200 receives a request for a high resolution image, the decompressor 230 may read the first compressed data CDT1 and the second compressed data CDT2 from the memory 220, and decompress the first compressed data CDT1 and the second compressed data CDT2 to generate second decompressed data DDT2. The decompressor 230 may output the generated first decompressed data DDT1 or second decompressed data DDT2 to the image signal processor 240. The first decompressed data DDT1 may correspond to the low resolution image data LIDT, and the second decompressed data DDT2 may correspond to the high resolution image data HIDT.

Each of the compressor 120 and the decompressor 230 may be implemented as software or hardware, or a combination of software and hardware such as firmware. When the compressor 120 and the decompressor 230 are implemented as software, each of the above-described functions may be implemented as programmed source code and may be located into a storage medium included in each of the camera module 100 and the image processing device 200. A processor (e.g., a microprocessor) included in each of the camera module 100 and the image processing device 200 may execute software, and thus functions of the compressor 120 and the decompressor 230 may be implemented. When the compressor 120 and the decompressor 230 are implemented in hardware, the compressor 120 and the decompressor 230 may include a logic circuit and a register, and may perform the functions described above based on register setting.

The image signal processor 240 may perform various image processing on the received image signal. In a non-limiting example, the image signal processor 240 may perform at least one image processing operation of defect pixel correction, offset correction, lens distortion correction, color gain correction, shading correction, gamma correction, denoising, and sharpening, on the image signal. In some embodiments, according to the performance of the camera module 100, some of the image processing operations described above may be omitted. For example, when the camera module 100 includes the image sensor 110 of high quality, defect pixel correction or offset correction among the image processing operations may be omitted.

When receiving the first decompressed data DDT1, the image signal processor 240 may perform image processing on the first decompressed data DDT1 to generate the low resolution image data LIDT. Also, when receiving the second decompressed data DDT2, the image signal processor 240 may perform image processing on the second decompressed data DDT2 to generate the high resolution image data HIDT. The image signal processor 240 may output the low resolution image data LIDT or the high resolution image data HIDT to the display 300.

The display 300 may display various content (e.g., text, images, videos, icons, or symbols) to a user based on the low resolution image data LIDT and/or the high resolution image data HIDT received from the image processing device 200. For example, the display 300 may include a liquid crystal display (LCD), a light emitting diode (LED) display, an organic light emitting diode (OLED) display, or a microelectromechanical system (MEMS) display, or an electronic paper display.

In FIG. 1, the image processing system 10 is illustrated as including the camera module 100, the image processing device 200, and the display 300, but the embodiments are not limited thereto. For example, the image processing system 10 may include only some of the camera module 100, the image processing device 200, and the display 300, or include a plurality of camera modules 100. In addition, although FIG. 1 illustrates that the decompressor 230 and the image signal processor 240 are separate elements, the embodiments are not limited thereto. For example, the image signal processor 240 may include the decompressor 230.

The first compressed data CDT1 used for generating a low resolution image may be generated, and the second compressed data CDT2 used for generating a high resolution image may be generated based on the first compressed data CDT1. Therefore, compared to the case in which compressed data used for generating the low resolution image and compressed data used for the high resolution image are independently generated, an amount of data of the first compressed data CDT1 and the second compressed data CDT may be reduced. Accordingly, power consumption due to transmission and reception of the compressed data between various devices may be reduced. Also, the efficiency of a storage space in which the compressed data is stored may increase.

Figure 2B:

FIGS. 2A and 2B are diagrams illustrating pixel arrays 113 and 115 according to embodiments. FIG. 2A is a diagram illustrating the pixel array 113 of a TETRA pattern, and FIG. 2B is a diagram illustrating the pixel array 115 of a NONA pattern.

The pixel arrays 113 and 115 may include a plurality of row lines, a plurality of column lines, a plurality of pixels PX respectively connected to the row lines and the column lines and arranged in a matrix form, and a plurality of color filters arranged to respectively correspond to the plurality of pixels PX.

The color filter may be applied in the form of a Bayer color filter. The Bayer pattern is based on an assumption that a human eye derives most of luminance data from a green component of a subject. Half of the pixels PX included in the Bayer color filter may detect a green signal, the other quarter may detect a red signal, and the other quarter may detect a blue signal.

For example, the Bayer color filter may have a configuration in which cells having a size of 2×2 including red pixels, blue pixels, and two green pixels are repeatedly arranged. In another example, the Bayer color filter may be a configuration in which cells having a size of 2×2 including a red pixel, a blue pixel, and two wide green W pixels are repeatedly arranged. That is, an RGB color filter method in which among the four pixels PX, a green filter is disposed in two pixels PX, and a blue filter and a red filter are respectively disposed in the remaining two pixels may be mostly selected.

However, the type of color filter is not limited to the above-described example. The color filter may have a configuration in which pixel groups PGs respectively corresponding to the reference colors are repeatedly arranged. For example, referring to FIG. 2A, the color filter may have a configuration in which a red pixel group including red pixels R arranged 2×2, a first green pixel group including first green pixels G arranged 2×2, a blue pixel group including blue pixels B arranged 2×2, and a second green pixel group including green pixels G arranged 2×2 are repeatedly arranged. Such a pattern may be referred to as the TETRA pattern.

As another example, referring to FIG. 2B, the color filter may have a configuration in which a red pixel group including the red pixels R arranged 3×3, a first green pixel group including the first green pixels G arranged 3×3, a blue pixel group including the blue pixels B arranged 3×3, and a second green pixel group including the green pixels G arranged 3×3 are repeatedly arranged. Such a pattern may be referred to as the NONA pattern.

The image sensor 110 of FIG. 1 may generate the image data IDT including pixel values of the pixels PX constituting the pixel arrays 113 and 115. Pixel values of the pixels PX may include information about the reference color (e.g., red, blue, green, etc.) corresponding to the corresponding pixel PX. The image data IDT may be compressed in units of the pixel group PG. Here, the pixel group PG may include pixels disposed adjacent to each other and corresponding to the same reference color. However, the embodiments are not limited thereto, and when the pixel array 113 includes the Bayer color filter described above, the pixel group PG may include a predetermined number (e.g., 4) of pixels PX disposed adjacent to each other.

For example, referring to FIG. 2A, because the pixel array 113 is in the TETRA pattern, the image data IDT may be compressed in units of the pixel group PG including 4 pixels PXs corresponding to the red, blue, or green color. As another example, referring to FIG. 2B, because the pixel array 115 is in a NONA pattern, the image data IDT may be compressed in units of the pixel group PG including 9 pixels PX corresponding to the red, blue, or green color.

Although in FIGS. 2A and 2B, the pixel arrays 113 and 115 of the RGB color filter method are illustrated, the embodiments are not limited thereto. For example, a Cyan, Yellow, Green, and Key (CYGM) color filter method in which color filters of cyan, yellow, green, and magenta are disposed on at least one pixel may be applied. Besides, a CYMK color filter method may be applied. In addition, although in the embodiments the Bayer pattern is illustrated for convenience of description, the embodiments are not limited to the Bayer pattern, and it is understood that a color filter including white or yellow, or having various patterns in which two or more color regions are merged may be applied.

In addition, although it is described with reference to FIGS. 2A and 2B that the image data IDT includes information about the reference color (e.g., RGB information), the embodiments are not limited thereto. The image sensor 110 may convert the RGB information of each pixel PX into YUV information including information about luminance and color difference through color space conversion. Accordingly, the image data IDT may include the YUV information corresponding to each pixel PX.

In addition, the image data IDT including the YUV information may also be compressed in units of the pixel group PG as in the above-described embodiment. However, because the image data IDT including the YUV information does not include information about the reference color, the pixel groups PG may be classified with respect to only positions of the pixels PX.

The image data IDT including the YUV information may classify the pixels PXs disposed adjacent to each other into one pixel group PG. For example, as described above with reference to FIGS. 2A and 2B, the pixels PX arranged 2×2 or the pixels PX arranged 3×3 may be classified into one pixel group PG. In addition, the image data IDT including the YUV information may be compressed in units of the pixel group PG.

Figure 3:
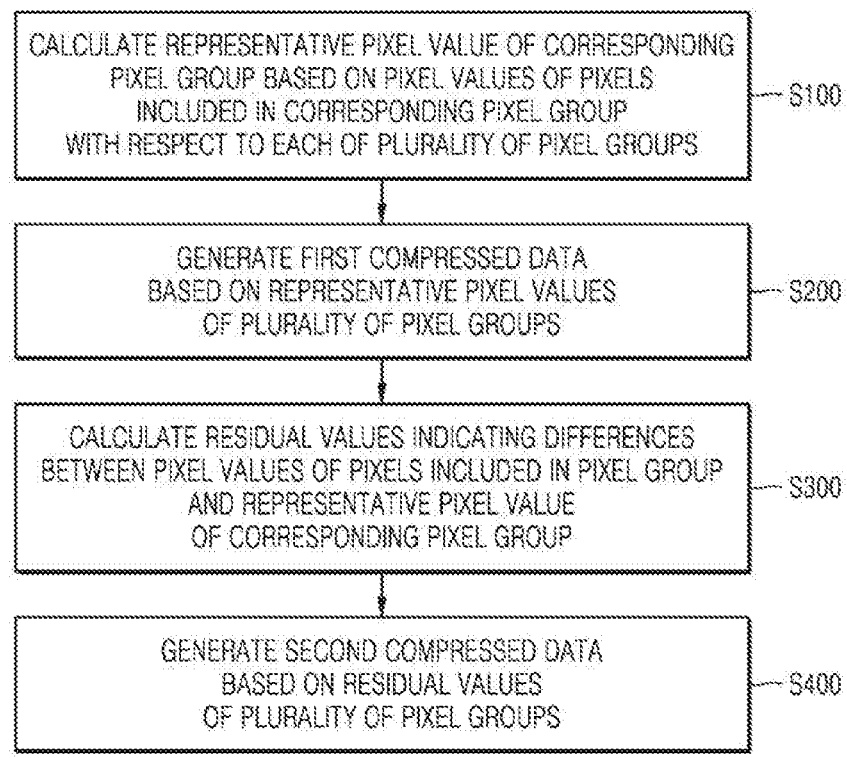
FIG. 3 is a flowchart showing an image compression method according to embodiments.

FIG. 3 is a flowchart showing an image compression method according to embodiments. FIG. 3 is a flowchart illustrating the image compression method of the image processing system 10 of FIG. 1. Any one or any combination of operations of FIG. 3 may be performed by the camera module 100 or the image processing device 200.

Referring to FIGS. 1 to 3, the image processing system 10 may calculate a representative pixel value of the corresponding pixel group PG based on pixel values of the pixels PX included in the corresponding pixel group PG with respect to each of the plurality of pixel groups PG of the image data IDT (operation S100). The image processing system 10 may classify the image data IDT including information (e.g., RGB information) about a reference color into the pixel groups PG including pixels adjacent to each other and having information about the same reference color. However, the embodiments are not limited thereto, and when the image data IDT includes YUV information, the image processing system 10 may classify the image data IDT into the pixel groups PG including the pixels adjacent to each other without distinction of the reference color. In addition, the image processing system 10 may calculate the representative pixel value representing each of the plurality of pixel groups PG. A detailed description of a method of calculating the representative pixel value will be provided later with reference to FIG. 4.

In addition, the image processing system 10 may generate the first compressed data CDT1 based on representative pixel values of the plurality of pixel groups PG (operation S200). The image processing system 10 may generate the first compressed data CDT1 by compressing representative pixel values of the plurality of pixel groups PG. A detailed description of a method of generating the first compressed data CDT1 will be provided later with reference to FIGS. 5 to 11.

In addition, with respect to each of the plurality of pixel groups PG, the image processing system 10 may calculate residual values indicating differences between the pixel values of the pixels PX included in the pixel group PG and the representative pixel value of the corresponding pixel group PG (operation S300). A detailed description of the method of calculating the residual values will be provided later with reference to FIG. 12. In addition, the image processing system 10 may generate the second compressed data CDT2 based on the residual values of the plurality of pixel groups PG (operation S400). A detailed description of a method of generating the second compressed data CDT2 will be provided later with reference to FIGS. 13 and 14.

Figure 4:
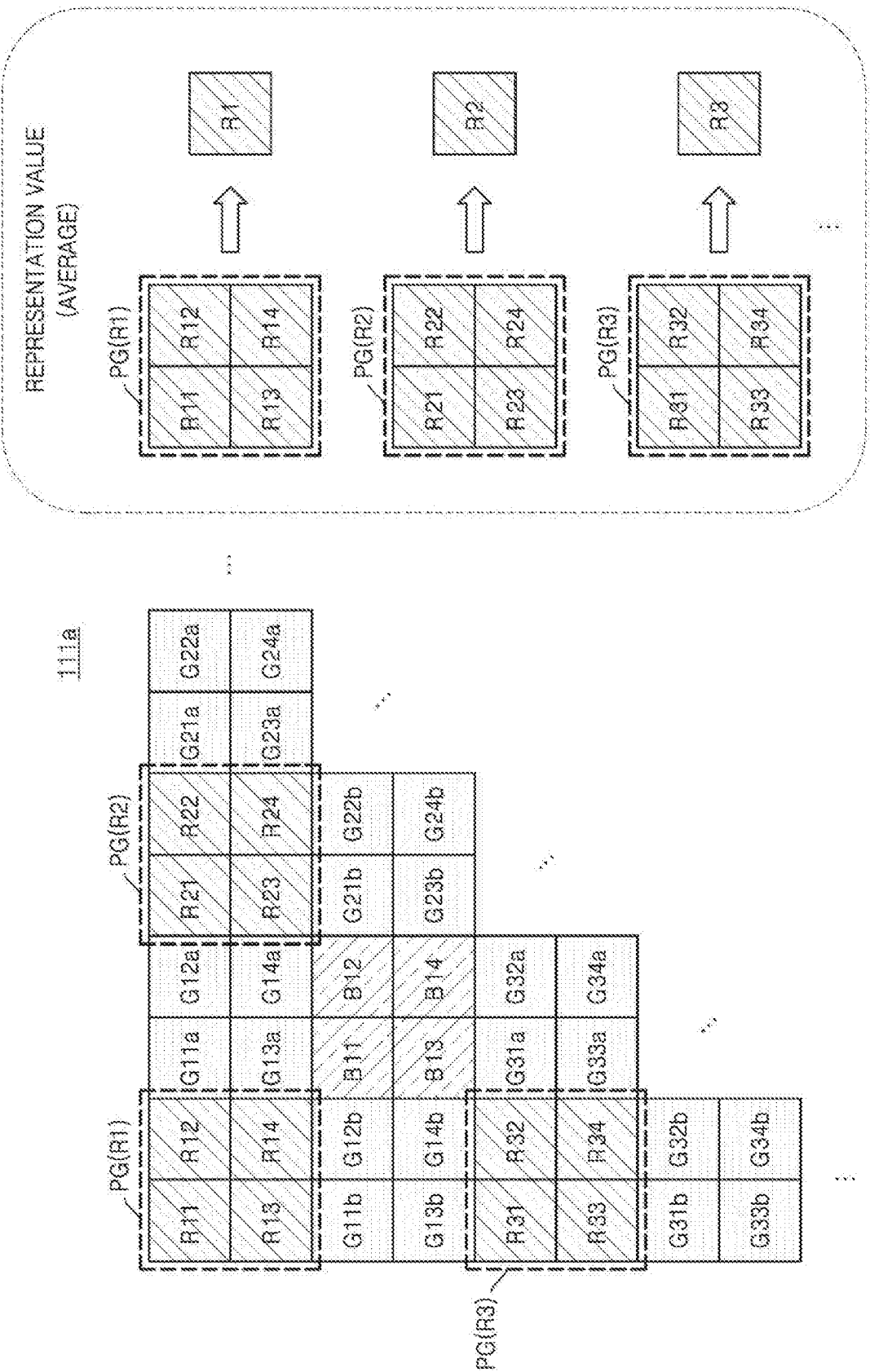
FIG. 4 is a diagram illustrating a method of calculating a representative pixel value of a pixel group, according to embodiments.

FIG. 4 is a diagram illustrating a method of calculating a representative pixel value of a pixel group, according to embodiments. Hereinafter, for convenience of explanation, it will be described assuming that the pixel array 111a has a TETRA pattern, like the pixel array 113 of FIG. 2A, and the image data IDT includes information about a reference color. Referring to FIG. 4, a pixel array 111a may include red pixel groups PG(R1), PG(R2), and PG(R3) adjacent to each other and corresponding to a red color. For example, the first red pixel group PG(R1) may include four red pixels R11, R12, R13, and R14, the second red pixel group PG(R2) may include four red pixels R21, R22, R23, and R24, and the third red pixel group PG(R3) may include four red pixels R31, R32, R33, and R34.

The compressor 120 may calculate an average pixel value of each of the red pixel groups PG(R1), PG(R2), and PG(R3). For example, the compressor 120 may calculate an average pixel value R1 of the red pixels R11, R12, R13, and R14 included in the first red pixel group PG(R1), an average pixel value R2 of the red pixels R21, R22, R23, and R24 included in the second red pixel group PG(R2), and an average pixel value R3 of the red pixels R31, R32, R33, and R34 included in the third red pixel group PG(R3). The compressor 120 may respectively determine the calculated average pixel values R1, R2, and R3 to be representative pixel values of the red pixel groups PG(R1), PG(R2), and PG(R3).

Although in FIG. 4 a method of calculating a representative pixel value with respect to a red pixel group is illustrated, the above-described embodiment may also be applied to a green pixel group and a blue pixel group. In addition, although FIG. 4 illustrates that the compressor 120 determines an average value of pixel values of the pixel group PG to be a representative pixel value, the embodiments are not limited thereto. For example, the compressor 120 may determine an intermediate value among the pixel values of the pixel group PG to be the representative pixel value, or may determine a pixel value of a pixel at a fixed position in the pixel group PG (as a non-limiting example, a pixel located in the upper left end among four pixels included in the pixel group PG) to be the representative pixel value. In addition, although FIG. 4 illustrates that the pixel array 111a is in a TETRA pattern, the embodiments are not limited thereto, the pixel array 111a may have a NONA pattern. Even in this case, the compressor 120 may determine the representative pixel value in substantially the same manner as in the above-described embodiment. For example, the compressor 120 may determine an average pixel value of 9 pixels included in the pixel group PG or a pixel value of a pixel at a fixed position (as a non-limiting example, a pixel located at the center of the pixel group PG) as the representative pixel value.

In addition, even when the image data IDT includes YUV information, the compressor 120 may determine the representative pixel value in substantially the same manner as in the above-described embodiment with respect to all the pixel groups PG of the image data IDT. That is, the compressor 120 may determine the average pixel value with respect to each of the pixel groups PG of the image data IDT including the YUV information to be the representative pixel value, or may determine the pixel value of the pixel at the fixed position in the pixel group PG to be the representative pixel value.

Figure 5:
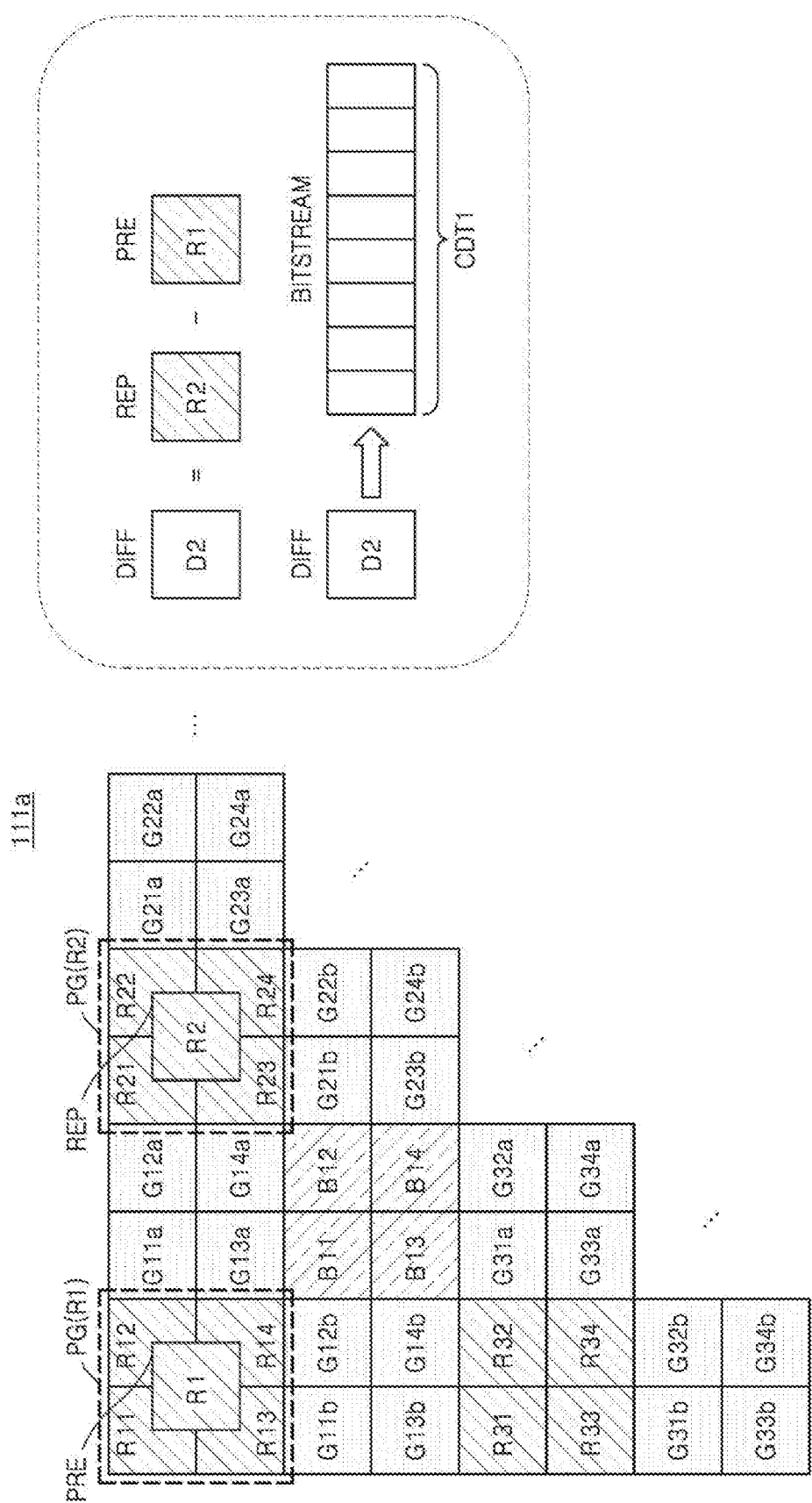
FIG. 5 is a diagram illustrating a method of generating first compressed data using representative pixel values, according to embodiments.

FIG. 5 is a diagram illustrating a method of generating the first compressed data CDT1 using representative pixel values, according to embodiments.

Referring to FIGS. 4 and 5, the compressor 120 may generate the first compressed data CDT1 by compressing representative pixel values of pixel groups corresponding to the same reference color. For example, the compressor 120 may compress representative pixel values of red pixel groups, compress representative pixel values of blue pixel groups, and compress representative pixel values of green pixel groups to generate the first compressed data CDT1.

Further, the compressor 120 may sequentially compress representative pixel values of pixel groups (hereinafter, referred to as the same color pixel groups) corresponding to the same reference color. The compressor 120 may calculate a difference value DIFF between a representative pixel value REP of a target pixel group to be compressed and a predicted value PRE of the target pixel group. Here, the predicted value PRE of the target pixel group may be determined based on pixel values of the same color pixel group that is previously compressed before the target pixel group. Further, the compressor 120 may generate an n-bit bitstream (n is a positive integer) based on the calculated difference value DIFF. In addition, the compressor 120 may generate the first compressed data CDT1 including the n-bit bitstream.

In some embodiments, the predicted value PRE of the target pixel group may be a representative pixel value REP of the same color pixel group that is compressed immediately before the target pixel group. Because the target pixel group and the previously compressed same color pixel group are adjacent to each other, it is highly likely for the target pixel group and the previously compressed same color pixel group to have similar pixel values. Accordingly, to increase a compression rate, pixel values of the same color pixel group that is compressed immediately before may be used to determine the predicted value PRE of the target pixel group.

For example, referring to FIGS. 4 and 5, the representative pixel value REP of the second red pixel group PG(R2) is R2, and the predicted value PRE is R1 that is the representative pixel value REP of the first read pixel group PG(R1) that is compressed immediately before. Accordingly, the compressor 120 may calculate D2, which is the difference value DIFF between R2, which is the representative pixel value REP of the second red pixel group PG(R2), and R1, which is the predicted value PRE, and generate an n-bit bitstream based on D2 that is the calculated difference value DIFF. A detailed description of a method of generating the n-bit bitstream based on the difference value DIFF will be provided later with reference to FIG. 6.

When the target pixel group is a first pixel group among the same color pixel groups, because the same color pixel group that is compressed immediately before does not exist, the predicted value PRE of the target pixel group has a default value. The default value may be set in advance by a user or a manufacturer, but the embodiments are not limited thereto, and may have a different default value for each image data IDT.

In another embodiment, the predicted value PRE of the target pixel group may be a pixel value of a pixel at a fixed position in the same color pixel group that is compressed immediately before the target pixel group. For example, the predicted value PRE of the target pixel group may be a lower right pixel among pixels included in the same color pixel group that is compressed immediately before. Referring to FIGS. 4 and 5, the predicted value PRE of the second red pixel group PG(R2) may be a pixel value of the fourth pixel R14 of the first red pixel group PG(R1). The fixed position is not limited to the above-described example and may be different according to embodiments. For example, the fixed position is sufficient if it is a position in the same color pixel group that is compressed before the target pixel group.

The compressor 120 may generate the first compressed data CDT1 by compressing representative pixel values of all the plurality of pixel groups PG constituting the image data IDT according to the above-described method. Accordingly, the compressor 120 may generate the first compressed data CDT1 including at least m×n bits with respect to the image data IDT including m (m is a positive integer) pixel groups PG.

According to a modifiable embodiment, the image data IDT may include the YUV information. Even in this case, the compressor 120 may generate the first compressed data CDT1 by compressing the image data IDT in substantially the same manner as in the above-described embodiment. As in the above-described embodiment, the compressor 120 may compress representative pixel values for each pixel group PG corresponding to the same reference color with respect to the image data IDT including the YUV information.

However, because the image data IDT including the YUV information does not include information about a reference color, according to an embodiment, the compressor 120 may sequentially compress the representative pixel values of the pixel groups PG without distinction of the reference color. For example, referring to FIG. 5, the compressor 120 may compress representative pixel values in the order of a first pixel group including pixels R11, R12, R13, and R14, a second pixel group including pixels G11a, G12a, G13a, and G14a, and a third pixel group including pixels R21, R22, R23, and R24.

Figure 6:
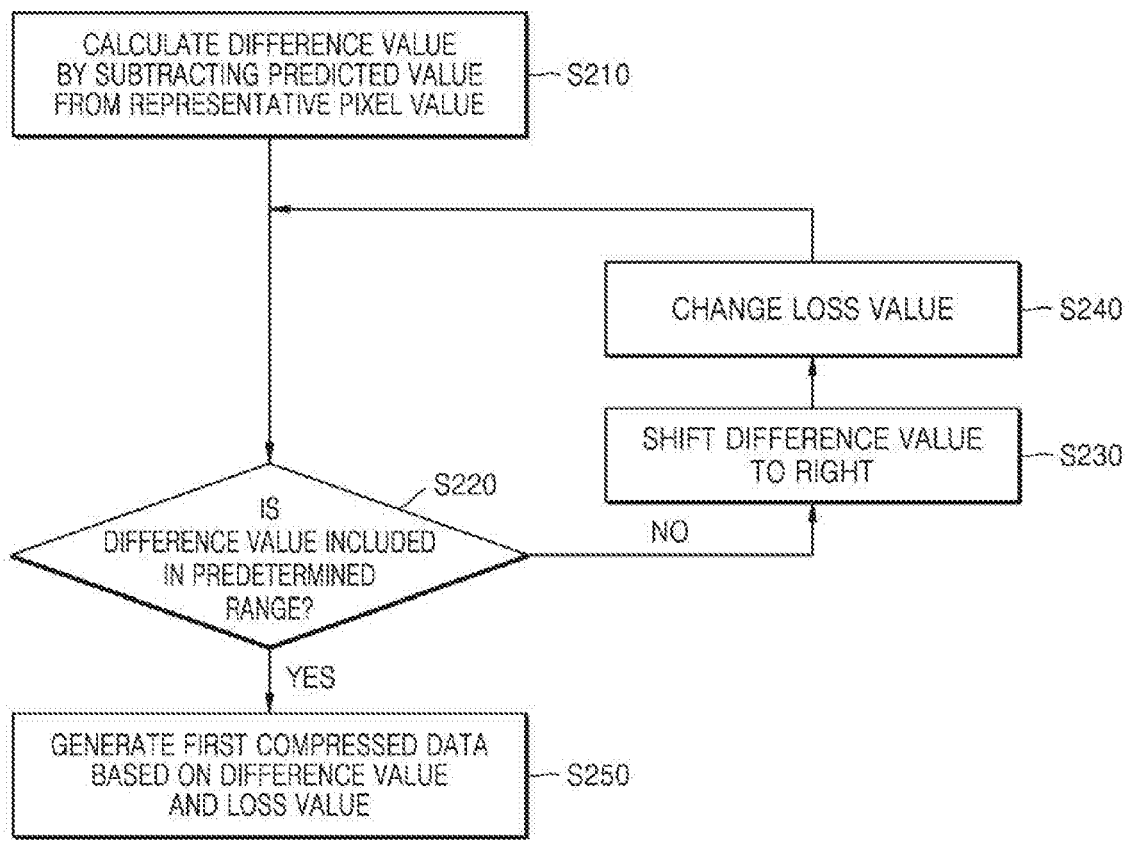
FIG. 6 is a flowchart illustrating a method of generating first compressed data, according to embodiments.

FIG. 6 is a flowchart illustrating a method of generating the first compressed data CDT1, according to embodiments. FIG. 6 is a flowchart illustrating the method, performed by the compressor 120, of generating the first compressed data CDT1 by compressing the representative pixel value REP of the pixel group PG.

Referring to FIGS. 4 to 6, first, the compressor 120 may calculate the difference value DIFF by subtracting the predicted value PRE from the representative pixel value REP of the pixel group PG (operation S210). A description of the method of determining the predicted value PRE is described above with reference to FIG. 5, and thus, a redundant description thereof is omitted. In addition, the compressor 120 may check whether the difference value DIFF is included in a predetermined range (operation S220). Here, the predetermined range refers to a range of integers that may be represented by k bits (k is a positive integer) including a sign bit. In addition, k is an integer smaller than n in FIG. 5 and may be set to different integers according to embodiments.

When the difference value DIFF is not included in the predetermined range (operation S220-N), the compressor 120 may shift the difference value DIFF to the right once (operation S230). In addition, the compressor 120 may change a loss value (operation S240). Here, the loss value is a value corresponding to the number of times the difference value DIFF is shifted to the right, and may initially have a default value. For example, the default value of the loss value may be set to 0. However, the embodiments are not limited thereto, and the default value of the loss value may be set to a value (e.g., 1) other than 0. The compressor 120 may increase the loss value each time a right shift is performed on the difference value DIFF. For example, the compressor 120 may increase the loss value by a value (e.g., 1) whenever the right shift is performed. Alternatively, according to an embodiment, the compressor 120 may be implemented to reduce the loss value by the value (e.g., 1) each time the right shift is performed. The method of changing the loss value may be variously set by a manufacturer or a user. However, hereinafter, for convenience of explanation, it is described assuming that the loss value is initially set to a value of 0, and increases by 1 whenever the right shift is performed.

In some embodiments, the loss value may be expressed in n-k bits. However, the embodiments are not limited thereto, and the loss value may be initially set to a value other than 0 (e.g., 1), and may be expressed as a smaller number of bits than n-k bits. In addition, the compressor 120 may perform operation S220 again.

When the difference value DIFF is included in the predetermined range (operation S220-Y), the compressor 120 may generate the first compressed data CDT1 based on the difference value DIFF and the loss value (operation S250). The compressor 120 may generate an n-bit bitstream including the difference value DIFF and the loss value. The difference value DIFF in this operation may be referred to as a reference value. A configuration of the n-bit bitstream will be described later with reference to FIG. 7.

As described above, the compressor 120 may generate compressed data including the difference value DIFF between the representative pixel values REP, instead of compressed data including the representative pixel values REP of the plurality of pixel groups PG, thereby increasing the compression rate firstly. In addition, when the difference value DIFF is large, the compressor 120 may generate the compressed data by shifting the difference value DIFF to the right, thereby increasing the compression rate secondarily.

FIG. 7 is a diagram illustrating a configuration of the first compressed data CDT1 according to embodiments. FIG. 7 is a diagram illustrating the first compressed data CDT1 corresponding to one pixel group PG.

Referring to FIG. 7, the first compressed data CDT1 corresponding to one pixel group PG may include 8 bits including 4 bits H1, H2, H3, and H4 constituting a header HEADER and 4 bits REF1, REF2, REF3, and REF4 constituting a reference value REFERENCE. The header HEADER may include the loss value LOSS described above with reference to FIG. 6, and may include additional information about compression in addition to the loss value LOSS according to an embodiment. Further, the reference value REFERENCE represents the difference value DIFF of operation S250 described above with reference to FIG. 6. That is, the reference value REFERENCE represents the difference value DIFF expressed within an integer range expressible in 4 bits including a sign bit.

The number of bits constituting the header HEADER and the number of bits constituting the reference value REFERENCE are not limited to the above-described example, and according to an embodiment, the number of bits constituting the header HEADER or the reference value REFERENCE may be set in various ways.

FIG. 8 is a diagram illustrating a method of calculating the loss value LOSS and the reference value REFERENCE of the first compressed data CDT1, according to embodiments. FIG. 8 is a diagram illustrating the method of calculating the loss value LOSS and the reference value REFERENCE of the first compressed data CDT1 of FIG. 7.

For example, referring to FIG. 7 and a top portion of FIG. 8, the representative pixel value REP of a pixel group PG may be 10, and the predicted value PRE may be 9. The compressor 120 may calculate 1 as the difference value DIFF between the representative pixel value REP and the predicted value PRE. Because 1, which is the difference value DIFF, is included in an integer range (i.e., equal to or more than −8 and equal to or less than 7) expressible in 4 bits including a sign bit, a right shift on the difference value DIFF may be omitted. Accordingly, the loss value LOSS may be 0000 indicating an initial value, and the reference value REF may be determined as 0001 indicating 1. The compressor 120 may generate an 8-bit bitstream (00000001) including the loss value LOSS and the reference value REF.

As another example, referring to FIG. 7 and a bottom portion of FIG. 8, the representative pixel value REP of a pixel group PG may be 10, and the predicted value PRE may be 1. The compressor 120 may calculate 9 as the difference value DIFF between the representative pixel value REP and the predicted value PRE. Because 9, which is the difference value DIFF, is not included in the integer range (i.e., equal to or more than −8 and equal to or less than 7) expressible in 4 bits including the sign bit, the compressor 120 may shift the difference value DIFF to the right, and increase the loss value LOSS by 1. Because a binary expression of 9 is 1001, the difference value DIFF may change to 0100 by the right shift, and the loss value LOSS may change to from a binary expression of 0000 to 0001. In addition, because the binary expression of 0100 is 4 in a decimal expression, and is included in the integer range, an additional right shift on the difference value DIFF may be omitted. Accordingly, the loss value LOSS may be 0001, and the reference value REF may be determined as 0100. The compressor 120 may generate the 8-bit bitstream of 00010100 including the loss value LOSS and the reference value REF.

FIG. 9 is a diagram illustrating a method of generating the first compressed data CDT1 using the representative pixel value REP, according to embodiments. FIG. 9 is a diagram illustrating a method of generating the first compressed data CDT1 in a different manner from that in FIG. 5 while calculating the representative pixel value REP in the same manner as in FIG. 5.

As described above with reference to FIG. 5, the compressor 120 may generate the first compressed data CDT1 by compressing representative pixel values of the same color pixel groups. In addition, the compressor 120 may sequentially compress the representative pixel values of the same color pixel groups. The representative pixel value may be determined as an average value of pixel values of a pixel group. The compressor 120 may calculate the difference value DIFF between the representative pixel value REP of a target pixel group to be compressed and the predicted value PRE of the target pixel group. Here, the predicted value PRE of the target pixel group may be determined based on pixel values of the same color pixel group compressed before the target pixel group.

In the embodiment of FIG. 9, the predicted value PRE of the target pixel group may be determined as a pixel value most similar to the representative pixel value REP among pixel values of the same color pixel group compressed before the target pixel group. In some embodiments, the predicted value PRE of the target pixel group may be determined as a pixel value most similar to the representative pixel value REP among pixel values of the same color pixel group compressed immediately before the target pixel group.

For example, referring to FIG. 9, the representative pixel value REP of the second red pixel group PG(R2) may be determined as R2, and the predicted value PRE may be determined as R13, which is the most similar pixel value among pixel values of the first red pixel group PG(R1) that is compressed immediately before. Accordingly, the compressor 120 may calculate D2, which is the difference value DIFF, between R2, which is the representative pixel value REP of the second red pixel group PG(R2), and R13, which is the predicted value PRE.

In the embodiment of FIG. 9, the compressor 120 may additionally generate a flag FLAG indicating information about a relative position of the pixel having the predicted value PRE. In addition, the compressor 120 may generate an n-bit bitstream based on the difference value DIFF and the flag FLAG. For example, referring to FIG. 9, the compressor 120 may generate the n-bit bitstream based on D2, which is the difference value DIFF, and F2, which is the flag FLAG indicating information about the relative position of the pixel R13. A detailed description of a method of generating the flag FLAG will be provided later with reference to FIG. 10.

According to a modifiable embodiment, the image data IDT may include YUV information, and even in this case, the compressor 120 may determine the predicted value PRE of the target pixel group in substantially the same manner as the above-described embodiment. As in the above-described embodiment, the compressor 120 may determine a pixel value corresponding to the same reference color as the target pixel group and most similar to the representative pixel value REP among the pixel values of the pixel group that is compressed immediately before as the predicted value PRE.

However, because the image data IDT including the YUV information does not include information about a reference color, according to an embodiment, the compressor 120 may determine a pixel value most similar to the representative pixel value REP among the pixel values of the pixel group that is compressed immediately before the target pixel group as the predicted value PRE without distinction of the reference color.

Figure 10:
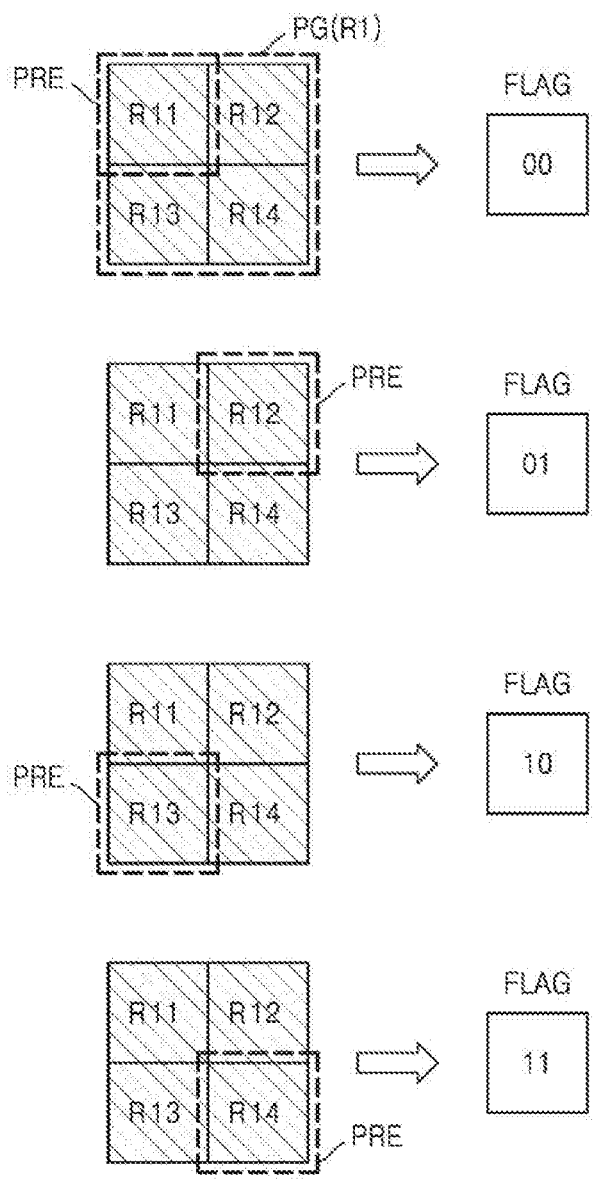
FIG. 10 is a diagram illustrating a method of calculating a flag of a pixel group, according to embodiments.

FIG. 10 is a diagram illustrating a method of calculating the flag FLAG of a pixel group, according to embodiments. FIG. 10 is a diagram illustrating a method of generating the flag FLAG based on the embodiment of FIG. 9.

The flag FLAG may indicate a relative position of a pixel having the predicted value PRE with respect to a target pixel group. For example, when the compressor 120 determines the predicted value PRE among pixel values of the same color pixel group compressed immediately before the target pixel group, the flag FLAG may have a value corresponding to a position of one of pixels of the same color pixel group compressed immediately before the target pixel group.

For example, referring to FIGS. 9 and 10, when the target pixel group is the second red pixel group PG(R2), the flag FLAG may have a value corresponding to a position of one of the pixels R11, R12, R13, and R14 included in the first red pixel group PG(R1). When the predicted value PRE is a pixel value of the pixel R11, the flag FLAG may have 00 as a value indicating a position of a first pixel (e.g., an upper left pixel) of a previous pixel group. In addition, when the predicted value PRE is a pixel value of the pixel R12, the flag FLAG may have 01 as a value indicating a position of a second pixel (e.g., an upper right pixel) of the previous pixel group. In addition, when the predicted value PRE is a pixel value of the pixel R13, the flag FLAG may have 10 as a value indicating a position of a third pixel (e.g., a lower left pixel) of the previous pixel group. In addition, when the predicted value PRE is a pixel value of the pixel R14, the flag FLAG may have 11 as a value indicating a position of the fourth pixel (e.g., a lower right pixel) of the previous pixel group.

Although in FIGS. 9 and 10 the pixel array 111 is illustrated as having a TETRA pattern, the embodiments are not limited thereto, and the pixel array 111 may be a pixel array 115 having a NONA pattern. Even in this case, the compressor 120 may determine the predicted value PRE of the target pixel group in substantially the same manner as in the above-described embodiment, and generate the flag FLAG corresponding to the position of the pixel having the predicted value PRE. For example, the compressor 120 may determine the predicted value PRE among 9 pixel values of the same color pixel group compressed immediately before the target pixel group, and generate the flag FLAG having a value indicating a position of a pixel having the predicted value PRE.

In addition, although it is shown in FIGS. 9 and 10 that the compressor 120 determines the predicted value PRE among the pixel values of the same color pixel group compressed immediately before the target pixel group, the embodiments are not limited thereto. For example, it is sufficient if the predicted value PRE is determined among the same color pixel groups compressed before the target pixel group. In addition, a sufficient number of bits may be allocated to the flag FLAG to represent the relative position of the pixel having the predicted value PRE.

Figure 11:
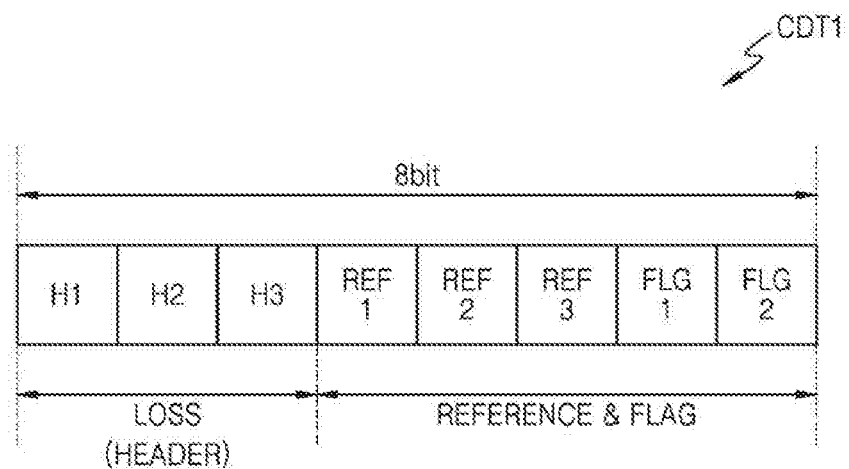
FIG. 11 is a diagram illustrating a configuration of first compressed data according to embodiments.

FIG. 11 is a diagram illustrating a configuration of the first compressed data CDT1 according to embodiments. FIG. 11 is a diagram illustrating the first compressed data CDT1 corresponding to one pixel group PG according to the embodiment of FIGS. 9 and 10.

Referring to FIG. 11, the first compressed data CDT1 corresponding to one pixel group PG may include 8 bits including 3 bits H1, H2, and H3 constituting the header HEADER, 3 bits REF1, REF2, and REF3 constituting the reference value REFERENCE and 2 bits FLG1 and FLG2 constituting the flag FLAG.

The header HEADER may include the loss value LOSS. Here, when comparing the loss value LOSS of FIG. 11 with the loss value LOSS of FIGS. 6 and 7, only the number of allocated bits is different, and the loss value LOSS may be calculated in substantially the same manner. Therefore, a redundant description of a method of calculating the loss value LOSS is omitted. The header HEADER may include additional information about compression in addition to the loss value LOSS according to an embodiment. In addition, when comparing the reference value REFERENCE with the reference value REFERENCE of FIGS. 6 and 7, only the number of allocated bits is different, and the reference value REFERENCE may be calculated in a substantially the same manner. Therefore, a redundant description of a method of calculating the reference value REFERENCE is omitted.

The number of bits constituting the header HEADER, the number of bits constituting the reference value REFERENCE, and the number of bits constituting the flag FLAG are not limited to the above-described example, and the number of bits may be set in various ways according to embodiments.

Figure 12:
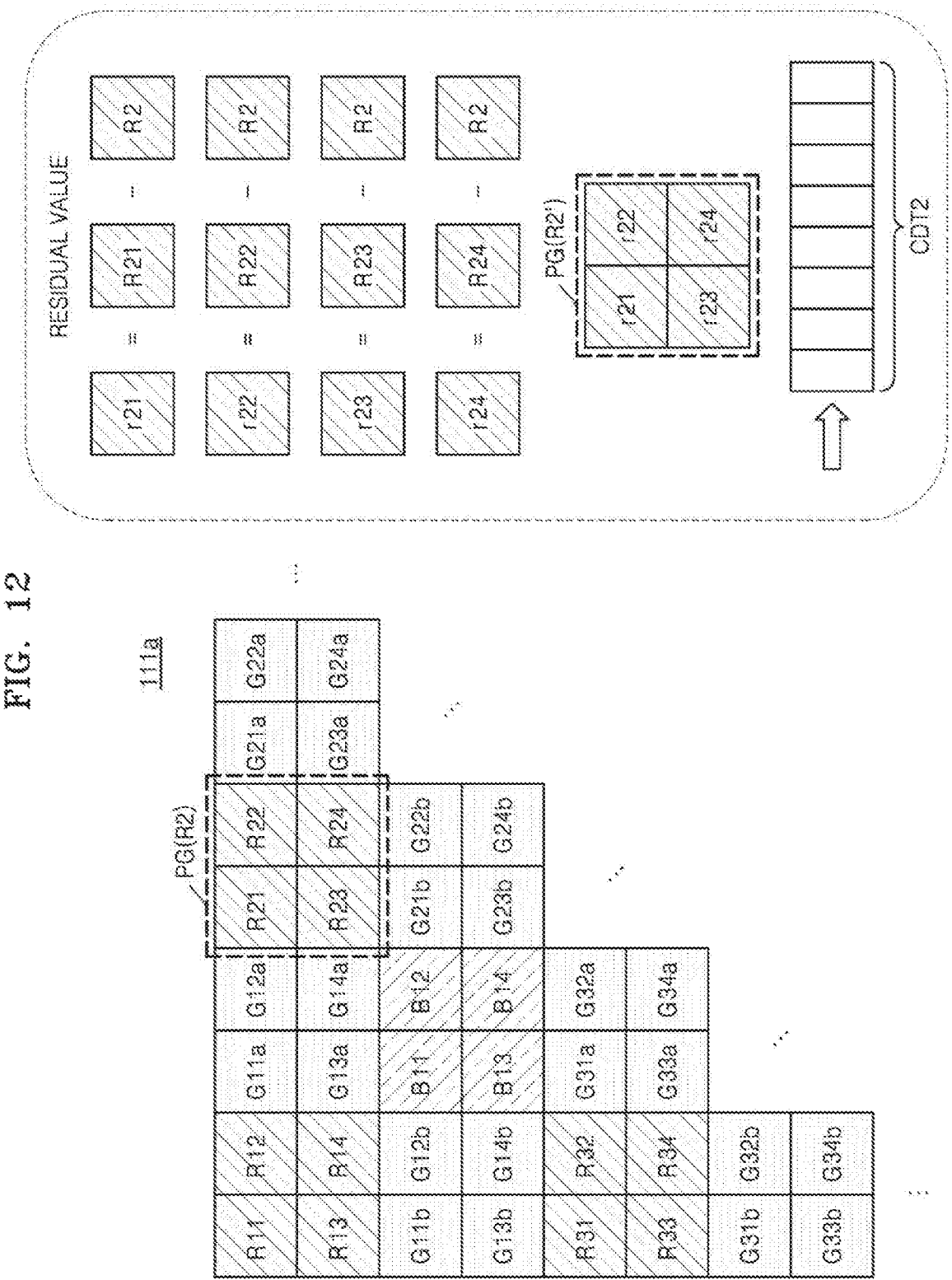
FIG. 12 is a diagram illustrating a method of generating second compressed data using residual values, according to embodiments.

FIG. 12 is a diagram illustrating a method of generating the second compressed data CDT2 using residual values, according to embodiments. Hereinafter, for convenience of description, it is described assuming that the pixel array 111a has a TETRA pattern, like the pixel array 113 of FIG. 2A, but the embodiments are not limited thereto, and even when the pixel array 111a has a NONA pattern, like the pixel array 115 of FIG. 2B, the pixel array 111a may also be applied.

The compressor 120 may generate the second compressed data CDT2 based on the image data IDT and representative pixel values of pixel groups. With respect to each of the plurality of pixel groups PG of the image data IDT, the compressor 120 may calculate residual values indicating differences between pixel values of pixels included in the corresponding pixel group and a representative pixel value of the corresponding pixel group. In addition, the compressor 120 may generate the second compressed data CDT2 based on the residual values of the plurality of pixel groups PG.

Referring to FIG. 12, the compressor 120 may calculate differences between the pixel values R21, R22, R23, and R24 of the second red pixel group PG(R2) and the representative pixel value R2. For example, the compressor 120 may calculate a first residual value r21 by subtracting the representative pixel value R2 from the first pixel value R21 of the second red pixel group PG(R2). Further, the compressor 120 may calculate a second residual value r22 by subtracting the representative pixel value R2 from the second pixel value R22 of the second red pixel group PG(R2). Further, the compressor 120 may calculate a third residual value r23 by subtracting the representative pixel value R2 from the third pixel value R23 of the second red pixel group PG(R2). Further, the compressor 120 may calculate a fourth residual value r24 by subtracting the representative pixel value R2 from the fourth pixel value R24 of the second red pixel group PG(R2).

Further, the compressor 120 may generate an i-bit bitstream based on the residual values r21, r22, r23, and r24 respectively corresponding to the pixel values R21, R22, R23, and R24 of the second red pixel group PG(R2). In addition, the compressor 120 may generate the second compressed data CDT2 including the i-bit bitstream.

The compressor 120 may generate the second compressed data CDT2 by calculating residual values with respect to all the plurality of pixel groups PG constituting the image data IDT according to the above-described method. Accordingly, the compressor 120 may generate the second compressed data CDT2 including at least m×i bits with respect to the image data IDT including m (m is a positive integer) pixel groups PG.

Figure 13:
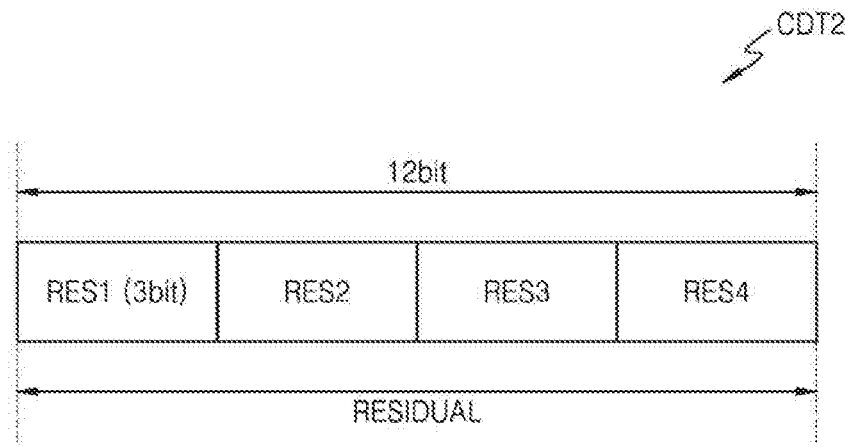
FIG. 13 is a diagram illustrating a configuration of second compressed data according to embodiments.

FIG. 13 is a diagram illustrating a configuration of the second compressed data CDT2 according to embodiments. FIG. 13 is a diagram illustrating the second compressed data CDT2 corresponding to one pixel group PG.

Referring to FIG. 13, the second compressed data CDT2 corresponding to one pixel group PG may include 12 bits and may include four residual values RESIDUAL included in the pixel group PG. Each of the residual values RESIDUAL may include 3 bits. A first residual value RES1 indicates a residual value for a first pixel of the pixel group PG, a second residual value RES2 indicates a residual value for a second pixel of the pixel group PG, a third residual value RES3 indicates a residual value for a third pixel of the pixel group PG, and a fourth residual value RES4 indicates a residual value for a fourth pixel of the pixel group PG.

Although in FIG. 13, as the pixel array 113 has a TETRA pattern, it is illustrated that the second compressed data CDT2 includes 4 residual values RESIDUAL, the embodiments are not limited thereto. For example, when the image data IDT of the pixel array 115 having a NONA pattern is compressed, the second compressed data CDT2 may include 9 residual values RESIDUAL.

In addition, although it is shown in FIG. 13 that each of the four residual values RESIDUAL included in the second compressed data CDT includes 3 bits, the embodiments are not limited thereto, and the number of bits allocated to each residual value RESIDUAL may be the same as or different from each other. For example, 3 bits may be allocated to the first residual value RES1, 4 bits may be allocated to the second residual value RES2, 2 bits may be allocated to the third residual value RES3, and 3 bits may be allocated to the fourth residual value RES4.

Figure 14:
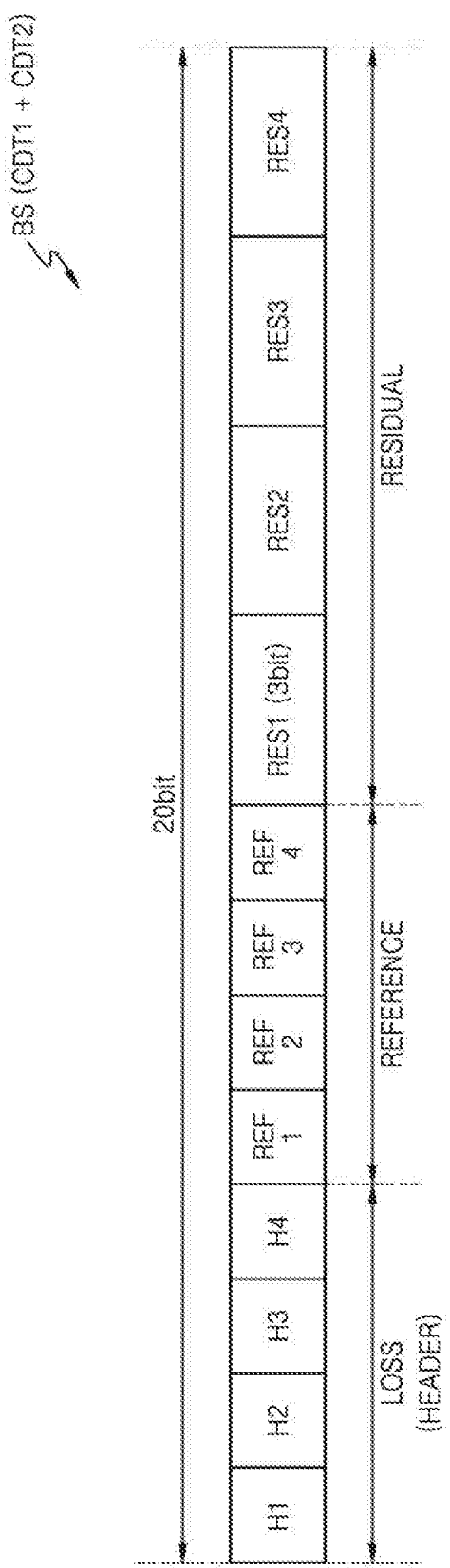
FIG. 14 is a diagram illustrating a bitstream including first compressed data and second compressed data according to embodiments.

FIG. 14 is a diagram illustrating a bitstream including the first compressed data CDT1 and the second compressed data CDT2 according to embodiments. FIG. 14 is a diagram illustrating a bitstream BS including the first compressed data CDT1 of FIG. 7 and the second compressed data CDT2 of FIG. 13.

Referring to FIG. 14, the compressor 120 may generate a 20-bit bitstream BS including the first compressed data CDT1 of FIG. 7 and the second compressed data CDT2 of FIG. 13. However, the embodiments are not limited thereto, and the compressor 120 may generate a 20-bit bitstream including the first compressed data CDT1 of FIG. 11 and the second compressed data CDT2 of FIG. 13. One bitstream BS may correspond to one pixel group PG.

When one pixel PX is expressed as a 10-bit pixel value, one pixel group PG of the image data IDT according to the TETRA pattern may have 40-bit pixel values. The first compressed data CDT1 and the second compressed data CDT2 may be expressed as a total of 20-bit pixel values, and thus, the first compressed data CDT1 and the second compressed data CDT2 may have a compression rate of 50%.

Although FIG. 14 shows that one bitstream BS includes 20 bits, the embodiments are not limited thereto, and one bitstream BS may include less or more than 20 bits according to the number of bits of the first compressed data CDT1 and the second compressed data CDT2. As the number of bits of the bitstream BS decreases, the compression rate may increase.

Figure 15:
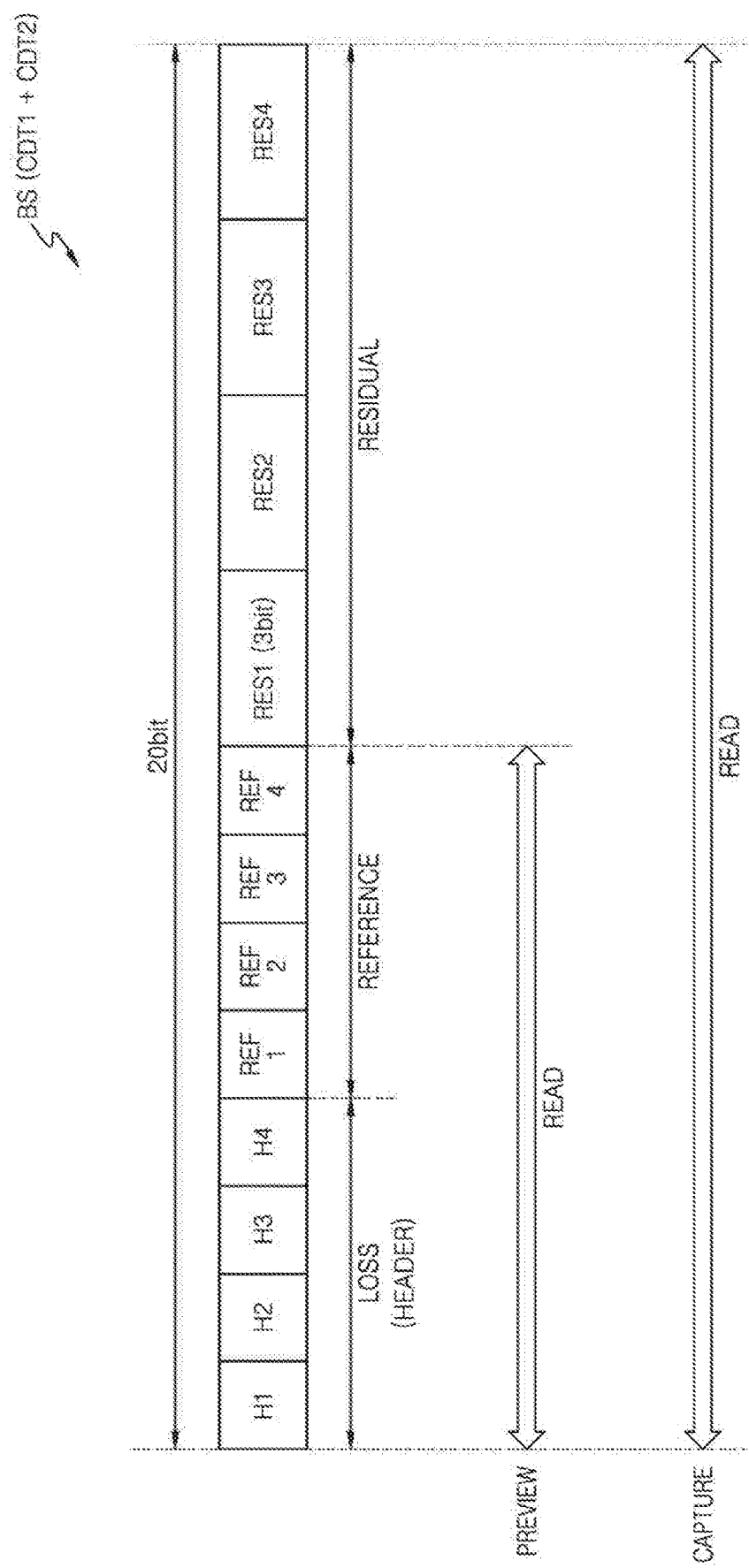
FIG. 15 is a diagram illustrating an image reading operation using a bitstream according to embodiments.

FIG. 15 is a diagram illustrating an image reading operation using a bitstream according to embodiments. FIG. 15 is a diagram illustrating an image reading operation using the bitstream BS of FIG. 14.

The compressor 120 may transmit the bitstream BS including the first compressed data CDT1 and the second compressed data CDT2 to the image processing device 200. The image processing device 200 may store the received bitstream BS in the memory 220. In some embodiments, the image processing device 200 may store the bitstream BS in the memory 220, but manage a storage location of the bitstream BS using a plurality of addresses. The image processing device 200 may manage the storage location of the bitstream BS using a first address indicating a storage location of the first compressed data CDT1 and a second address indicating a storage location of the second compressed data CDT2.

When receiving a request for a low resolution image such as a preview image PREVIEW, the image processing device 200 may read the first compressed data CDT1 from the memory 220. For example, referring to FIG. 15, the image processing device 200 may read 8 bits (the header HEADER and the reference value REFERENCE) corresponding to the first compressed data CDT1 from the memory 220 based on the first address. Further, 12 bits (residual values RESIDUAL) corresponding to the second compressed data CDT2 are not read from the memory 220.

When receiving a request for a high resolution image such as a full resolution image (or a captured image CAPTURE), the image processing device 200 may read the first compressed data CDT1 and the second compressed data CDT2 from the memory 220. For example, referring to FIG. 15, the image processing device 200 may read the first compressed data CDT1 from the memory 220 based on the first address, and read the second compressed data CDT2 from the memory 220 based on the second address.

As described above, the image processing device 200 may read the first compressed data CDT1 regardless of the resolution of the requested image, and when the resolution of the requested image is a resolution of the high resolution image, may additionally read the second compressed data CDT2. That is, even if the received request is changed from the low resolution image request to the high resolution image request, the image processing device 200 may generate the high resolution image by additionally reading only the second compressed data CDT2. Therefore, in response to a request for the high resolution image, the image processing device 200 may generate the high resolution image at a high speed.

Figure 16:
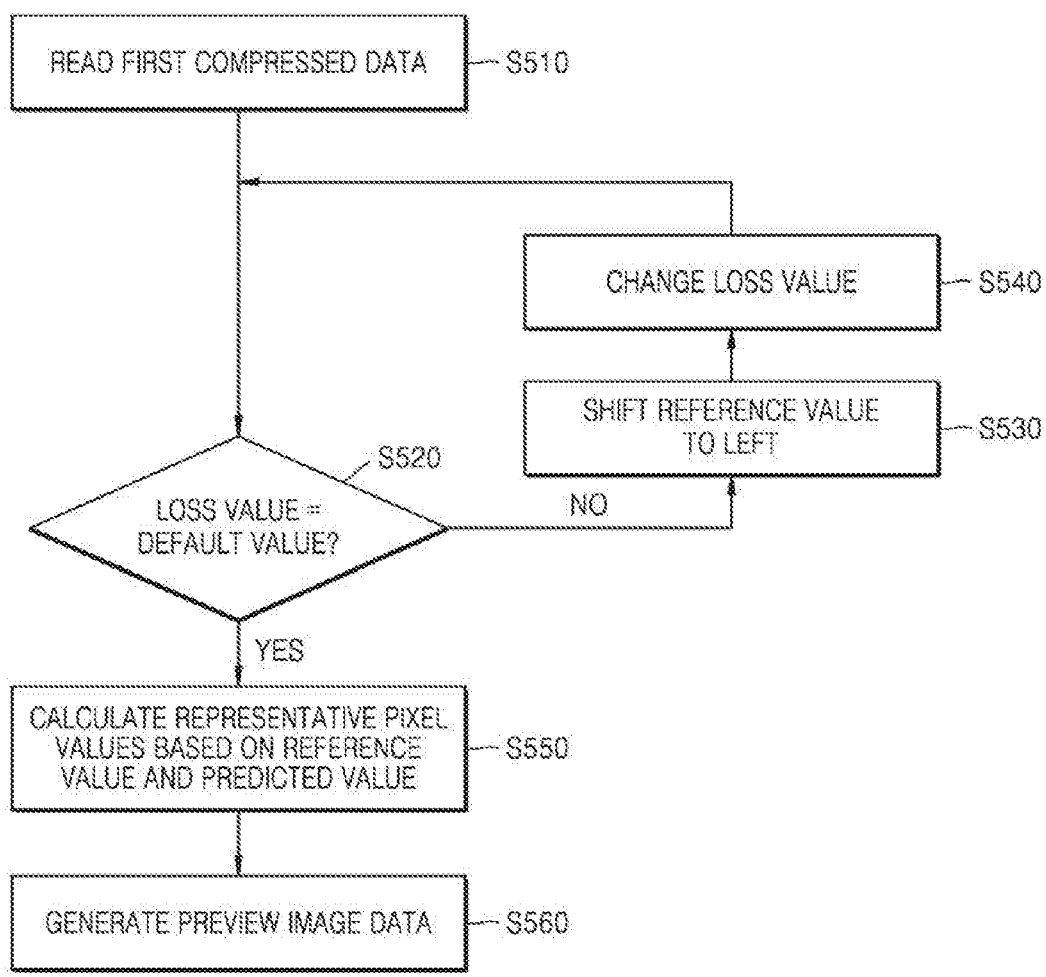
FIG. 16 is a flowchart illustrating a method of generating a low resolution image, according to embodiments.

FIG. 16 is a flowchart illustrating a method of generating a low resolution image according to embodiments. FIG. 16 is a flowchart illustrating a method of generating a low resolution image (e.g., a preview image) of the image processing system 10 of FIG. 1. Any one or any combination of operations of FIG. 16 may be performed by the decompressor 230 or the image signal processor 240 of the image processing device 200.

Referring to FIGS. 1, 15, and 16, the image processing system 10 may read the first compressed data CDT1 (operation S510). When receiving a request for the low resolution image, the image processing system 10 may read the first compressed data CDT1 from the memory 220.

In addition, the image processing system 10 may check whether the loss value LOSS of the first compressed data CDT1 is a default value (operation S520). For example, the default value of the loss value may be set to 0. In this case, the image processing system 10 may check whether bits corresponding to the loss value LOSS in the first compressed data CDT1 represent 0. However, the embodiments are not limited thereto, and the default value of the loss value may be set to a value (e.g., 1) other than 0. If the loss value LOSS has the default value, the loss value LOSS indicates that a left shift on the reference value REFERENCE is unnecessary. Conversely, when the loss value LOSS does not have the default value, the loss value LOSS indicates that the left shift on the reference value REFERENCE is required.

If the loss value LOSS is not the default value (operation S520-N), the image processing system 10 may shift the reference value REFERENCE of the first compressed data CDT1 to the left once (operation S530). In addition, the image processing system 10 may change the loss value LOSS of the first compressed data CDT1 (operation S540). The image processing system 10 may reduce the loss value LOSS each time the left shift is performed on the reference value REFERENCE. For example, the image processing system 10 may reduce the loss value LOSS by a value (e.g., 1) each time the left shift is performed. In this case, it is assumed that a method of increasing the loss value LOSS is applied whenever data loss occurs in the process of generating the first compressed data CDT1. Alternatively, according to an embodiment, the image processing system 10 may be implemented to increase the loss value LOSS by a value (e.g., 1) each time the left shift is performed. In this case, it is assumed that a method of reducing the loss value LOSS is applied whenever data loss occurs in the process of generating the first compressed data CDT1. The method of changing the loss value LOSS may be variously set by a manufacturer or a user. However, hereinafter, for convenience of explanation, it is described assuming that the default value of the loss value LOSS is set to a value of 0, and decreases by 1 each time the left shift is performed. As such, when the loss value LOSS does not have the default value, the image processing system 10 may shift the reference value REFERENCE to the left and gradually change the loss value LOSS to a value similar to the default value.

In addition, the image processing system 10 may perform operation S520 again.

When the loss value LOSS is the default value (operation S520-Y), the image processing system 10 may calculate the representative pixel values REP of the pixel group PG based on the reference value REFERENCE and the predicted value PRE of the first compressed data CDT1 (operation S550). The image processing system 10 may check the predicted value PRE of a target pixel group to be decompressed. In addition, the image processing system 10 may calculate the representative pixel value REP of the target pixel group by adding the predicted value PRE and the reference value REP of the target pixel group. Here, the predicted value PRE of the target pixel group to be decompressed may be determined based on pixel values of a pixel group decompressed before the target pixel group. In addition, the predicted value PRE of the target pixel group may be determined in a manner corresponding to the method of generating the first compressed data CDT1.

For example, when the first compressed data CDT1 is generated according to the embodiment of FIG. 5, the predicted value PRE of the target pixel group to be decompressed may be determined as a representative pixel value of the same color pixel group decompressed immediately before the target pixel group. As another example, when the first compressed data CDT1 is generated according to the embodiment of FIG. 9, the predicted value PRE of the target pixel group to be decompressed may be determined as a pixel value of a pixel identified by the flag FLAG. The method of calculating the predicted value PRE of the target pixel group is not limited to the above-described example, and various methods may be applied.

According to a modifiable embodiment, in operation S520, it may be checked whether the loss value LOSS has a predetermined value other than zero. Here, the predetermined value may be set to a value indicating that a left shift operation is unnecessary. In addition, the image processing system 10 may generate low resolution image data LIDT based on the representative pixel values REP of the pixel groups PG (operation S560). The image processing system 10 may generate the low resolution image data LIDT including the representative pixel values REP.

The image processing system 10 may provide the generated low resolution image data LIDT to the display 300. In addition, the display 300 may display the low resolution image (e.g., a preview image) based on the received low resolution image data LIDT.

Figure 17:
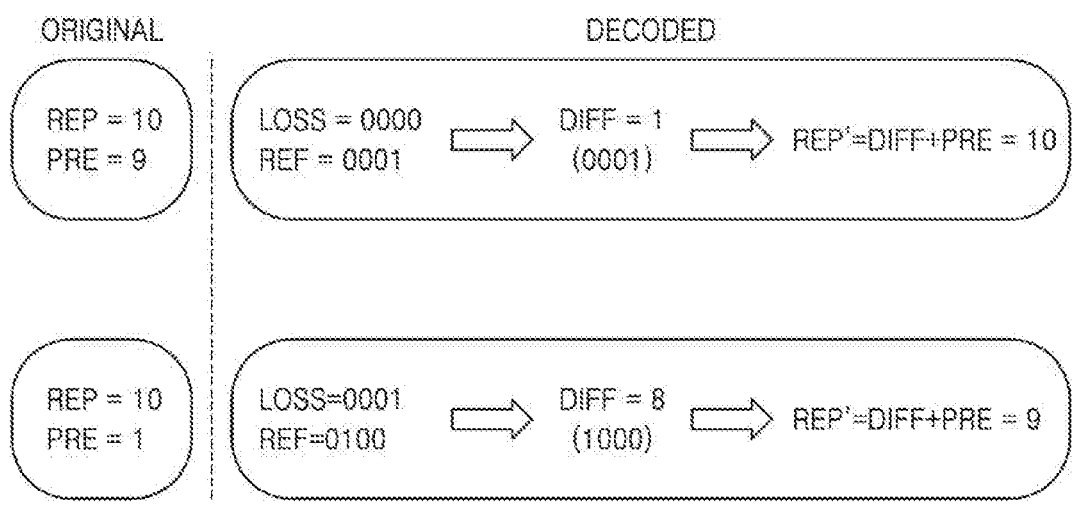
FIG. 17 is a diagram illustrating a decompression operation using first compressed data according to embodiments.

FIG. 17 is a diagram illustrating a decompression operation using the first compressed data CDT1 according to embodiments. FIG. 17 is a diagram illustrating examples of operations S520 to S550 of FIG. 16 by using the first compressed data CDT1 generated according to the embodiment of FIG. 8.

For example, referring to FIGS. 8 and 17, the representative pixel value REP of a pixel group PG before compression may be 10, and the predicted value PRE may be 9. In addition, in the first compressed data CDT1, the loss value LOSS of the pixel group PG may be 0000, and the reference value REF may be 0001. Because the image processing system 10 has the loss value LOSS of 0, a left shift on the reference value REF, 0001, may be omitted. The reference value REF when the loss value LOSS is 0 may be referred to as the difference value DIFF indicating a difference between the representative pixel value REP and the predicted value PRE of a target pixel group. The image processing system 10 may calculate 10 as the representative pixel value REP', which is a result of decompression, by adding 1 that is the difference value DIFF and 9 that is the predicted value PRE.

As another example, referring to FIGS. 8 and 17, the representative pixel value REP of a pixel group PG before compression may be 10, and the predicted value PRE may be 1. In addition, in the first compressed data CDT1, the loss value LOSS of the pixel group PG may be 0001, and the reference value REF may be 0100. Because the loss value LOSS is not 0, the image processing system 10 may shift the reference value REF to the left and decrease the loss value LOSS by 1. The reference value REF may change to 1000 by a left shift, and the loss value LOSS may change from 0001 to 0000. Accordingly, the difference value DIFF may be 1000 in a binary expression and 8 in a decimal expression. The image processing system 10 may calculate 9 as the representative pixel value REP', which is a result of decompression, by adding 8 that is the difference value DIFF and 1 that is the predicted value PRE.

Figure 18:
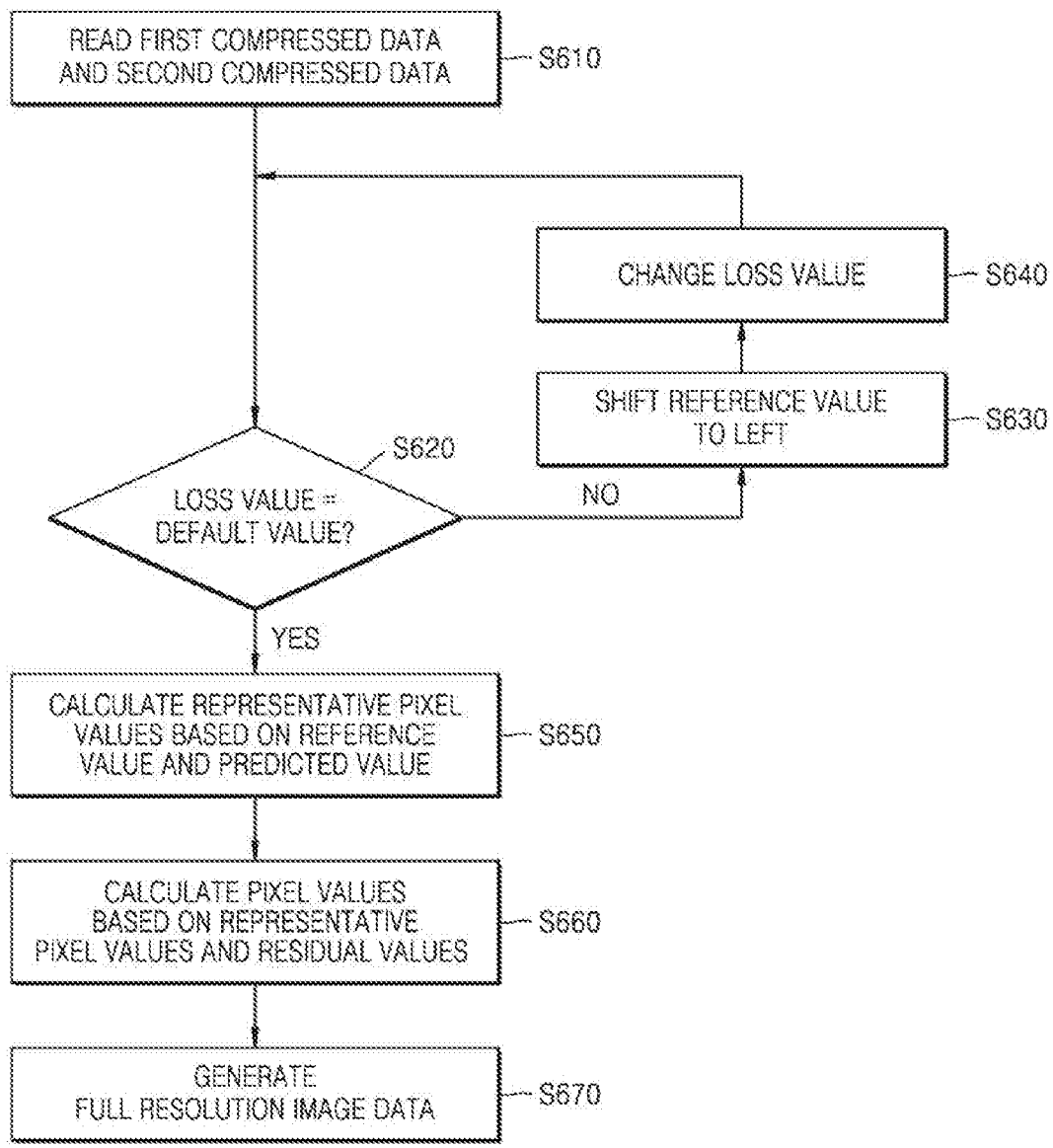
FIG. 18 is a flowchart illustrating a method of generating a high resolution image, according to embodiments.

FIG. 18 is a flowchart illustrating a method of generating a high resolution image according to embodiments. FIG. 18 is a flowchart illustrating a method of generating a high resolution image (e.g., a full resolution image) of the image processing system 10 of FIG. 1. Any one or any combination of operations of FIG. 18 may be performed by the decompressor 230 or the image signal processor 240 of the image processing device 200.

Referring to FIGS. 16 and 18, the image processing system 10 may read the first compressed data CDT1 and the second compressed data CDT2 (operation S610). When receiving a request for the high resolution image, the image processing system 10 may read the first compressed data CDT1 and the second compressed data CDT2 from the memory 220.

In addition, the image processing system 10 may check whether the loss value LOSS of the first compressed data CDT1 is a default value (operation S620). When the loss value LOSS is not the default value (operation S620-N), the image processing system 10 may shift the reference value REFERENCE of the first compressed data CDT1 to the left once (operation S630). In addition, the image processing system 10 may change the loss value LOSS of the first compressed data CDT1 (operation S640). For example, the image processing system 10 may reduce the loss value LOSS when a method of increasing the loss value LOSS is applied whenever data loss occurs in a process of generating the first compressed data CDT1. Alternatively, the image processing system 10 may increase the loss value LOSS when a method of reducing the loss value LOSS is applied whenever data loss occurs in the process of generating the first compressed data CDT1. When the loss value LOSS is the default value (operation S620-Y), the image processing system 10 may calculate the representative pixel values REP of the pixel groups PG based on the reference value REFERENCE and the predicted value PRE of the first compressed data CDT1 (operation S650). Operations S620 to S650 of FIG. 18 may be substantially the same as operations S520 to S550 of FIG. 17, respectively, and thus detailed descriptions thereof are omitted.

In addition, the image processing system 10 may calculate pixel values based on the representative pixel values REP and the residual values RESIDUAL of the second compressed data CDT2 (operation S660). The image processing system 10 may calculate pixel values of the target pixel group PG by adding the representative pixel value REP of the target pixel group PG to each of the residual values RESIDUAL of the target pixel group PG to be decompressed.

In addition, the image processing system 10 may generate high resolution image data HIDT based on the pixel values of the pixel groups PG (operation S670). The image processing system 10 may generate the high resolution image data HIDT including the calculated pixel values.

The image processing system 10 may provide the generated high resolution image data HIDT to the display 300. In addition, the display 300 may display the high resolution image (e.g., the full resolution image) based on the received high resolution image data HIDT.

Figure 19:
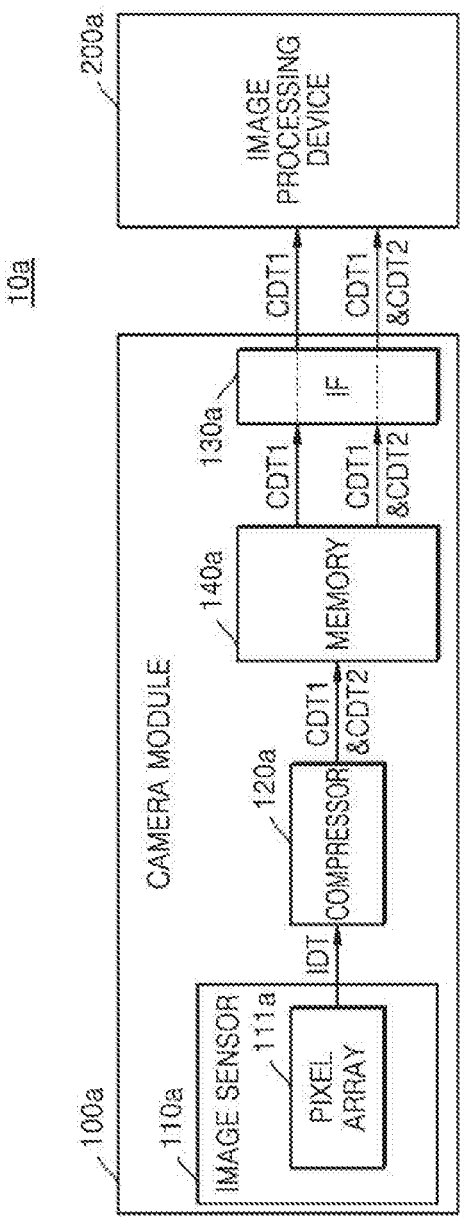
FIG. 19 is a diagram illustrating a camera module according to embodiments.

FIG. 19 is a diagram illustrating a camera module 100a according to embodiments. FIG. 19 is a diagram illustrating the camera module 100a of an image processing system 10a that is a modifiable embodiment of the image processing system 10 of FIG. 1.

Referring to FIG. 19, the image processing system 10a may include the camera module 100a and an image processing device 200a. In an embodiment, the camera module 100a may include an image sensor 110a, a compressor 120a, a memory 140a, and an interface (IF) 130a. The camera module 100a of FIG. 19 may further include the memory 140a when compared to the camera module 100 of FIG. 1. The image sensor 110a, the compressor 120a, and the interface 130a of FIG. 19 may operate similarly to the image sensor 110, the compressor 120, and the interface 130 of FIG. 1, respectively, and thus redundant descriptions with those described with reference to FIG. 1 are omitted.

The compressor 120a may generate the first compressed data CDT1 and the second compressed data CDT2, and store the generated first compressed data CDT1 and second compressed data CDT2 in the memory 140a When a low resolution image (e.g., a preview image) is used, the first compressed data CDT1 may be read from the memory 140a and output through the interface 130a. In addition, when a full resolution image is used, the first compressed data CDT1 and the second compressed data CDT2 may be read from the memory 140a and output through the interface 130a.

That is, according to the embodiment of FIG. 19, the first compressed data CDT1 and the second compressed data CDT2 may be collectively stored in the memory 140a, and selectively read from the memory 140a according to the type of image data.

Figure 20:
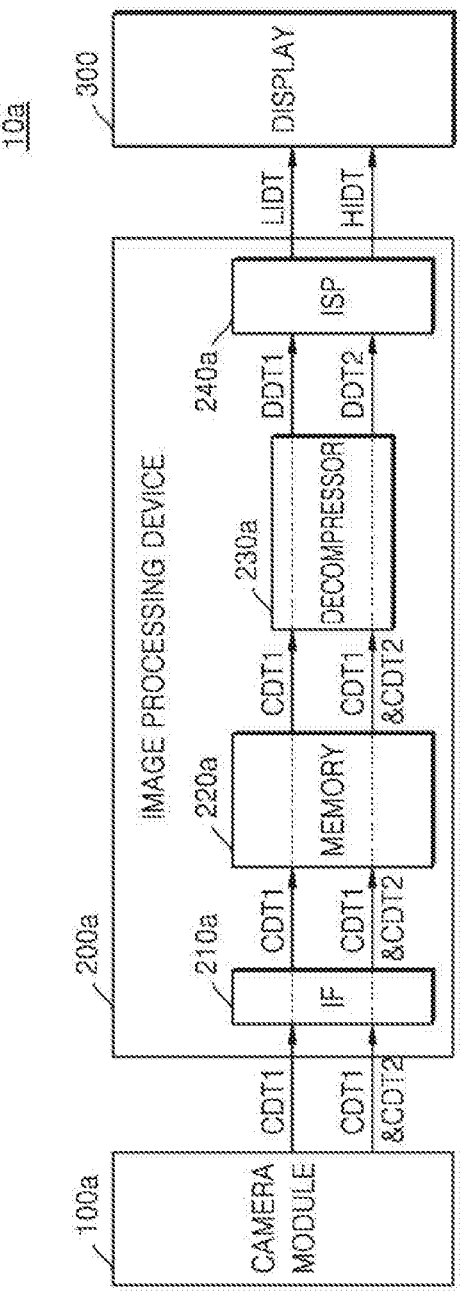
FIG. 20 is a diagram illustrating an image processing device according to embodiments.

FIG. 20 is a diagram illustrating the image processing device 200a according to embodiments. FIG. 20 is a diagram illustrating the image processing device 200a of the image processing system 10a of FIG. 19.

Referring to FIGS. 19 and 20, the image processing device 200a may include an interface (IF) 210a, a memory 220a, a decompressor 230a, and an image signal processor 240a. The image processing device 200a of FIG. 19 includes the same elements as the image processing device 200 of FIG. 1 and may operate similarly, and thus redundant descriptions with those described above in FIG. 1 are omitted.

The image processing device 200a may receive the first compressed data CDT1 and the second compressed data CDT2 from the camera module 100a of FIG. 19. According to the present embodiment, upon receiving a request for a low resolution image (e.g., a preview image), the image processing device 200a may request the first compressed data CDT1 from the camera module 100a. Upon receiving the first compressed data CDT1 through the interface 210a, the image processing device 200a may decompress the first compressed data CDT1 through the decompressor 230a to generate first decompressed data DDT1. In addition, the image processing device 200a may perform image processing on the first decompressed data DDT1 through the image signal processor 240a to generate the low resolution image data LIDT. In addition, the image processing device 200a may provide the low resolution image data LIDT to the display 300.

Also, when receiving a request for a full resolution image, the image processing device 200a may request the first compressed data CDT1 and the second compressed data CDT2 from the camera module 100a. In addition, the image processing device 200a may receive the first compressed data CDT1 and the second compressed data CDT2 through the interface 210a. In addition, the image processing device 200a may decompress the first compressed data CDT1 and the second compressed data CDT2 through the decompressor 230a to generate second decompressed data DDT2. In addition, the image processing device 200a may perform image processing on the second decompressed data DDT2 through the image signal processor 240a to generate the high resolution image data HIDT. In addition, the image processing device 200a may provide the high resolution image data HIDT to the display 300.

That is, according to the embodiment of FIG. 20, the image processing device 200a may request compressed data in real time and receive the requested compressed data from the camera module 100a to generate low resolution image data or high resolution image data. In the above-described embodiments, the image processing device 200a may be implemented to store the first compressed data CDT1 and the second compressed data CDT2 in the memory 220a.

Figure 21:
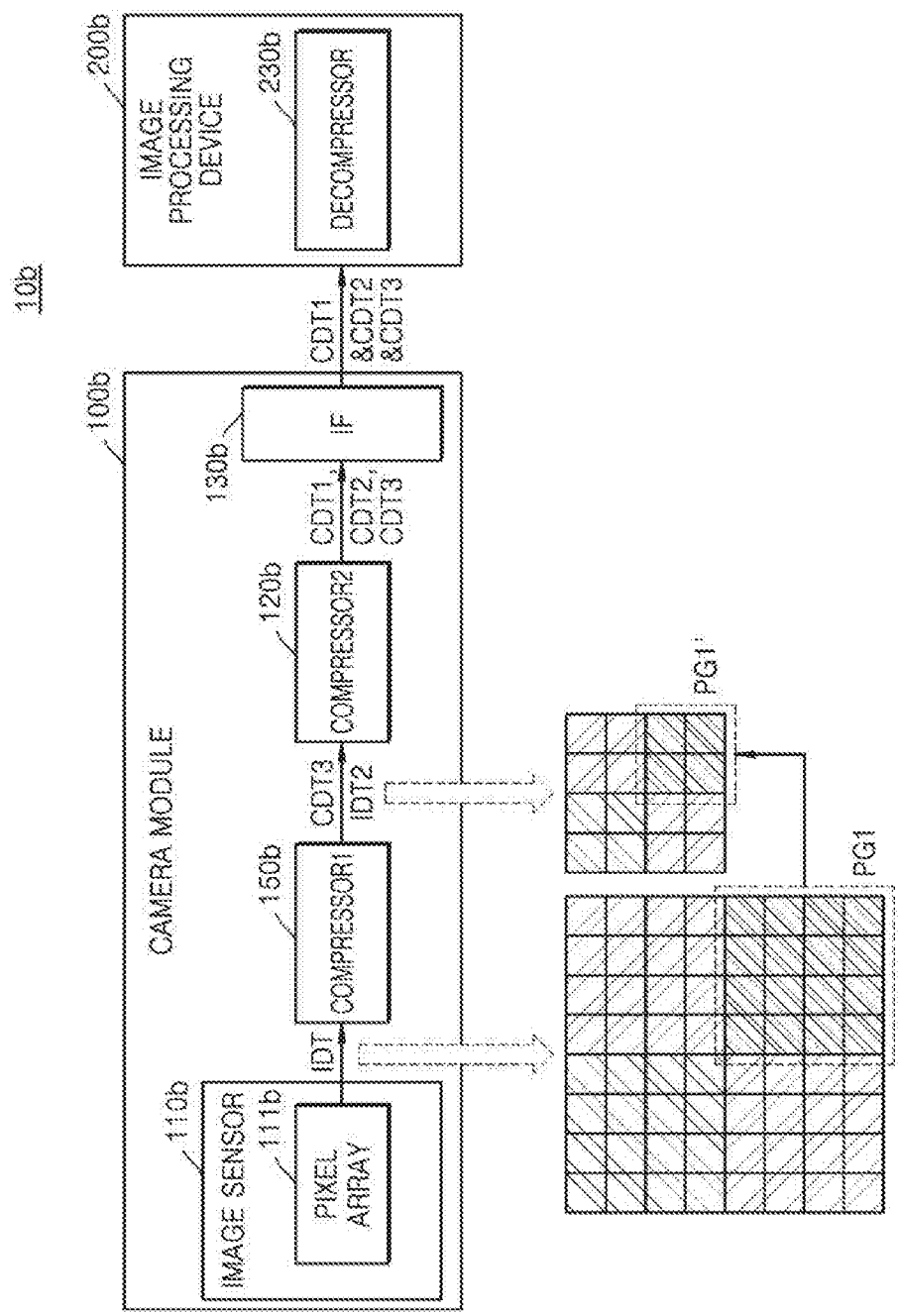
FIG. 21 is a diagram illustrating a camera module according to embodiments.

FIG. 21 is a diagram illustrating a camera module 100b according to embodiments. FIG. 21 is a diagram illustrating the camera module 100b of an image processing system 10b that is a modifiable embodiment of the image processing system 10 of FIG. 1.

Referring to FIG. 21, the image processing system 10b may include the camera module 100b and an image processing device 200b. In an embodiment, the camera module 100b may include an image sensor 110b, a first compressor 150b, a second compressor 120b, and an interface (IF) 130b. The camera module 100b of FIG. 21 may further include a first compressor 150b when compared to the camera module 100 of FIG. 1. The image sensor 110b, the second compressor 120b, and the interface 130b of FIG. 21 may operate similarly to the image sensor 110, the compressor 120, and the interface 130 of FIG. 1, respectively, and thus redundant descriptions those described with reference to FIG. 1 above are omitted.

In some embodiments, the pixel array 111b of the image sensor 110b may include a color filter of a DECAHEXA pattern. The color filter of the pixel array 111b may be a configuration in which a red pixel group including red pixels R arranged in 4×4, a first green pixel group including first green pixels G arranged in 4×4, a blue pixel group including blue pixels B arranged in 4×4, and a second green pixel group including green pixels G arranged in 4×4 are repeatedly arranged. In addition, the image sensor 110b may generate the image data IDT of the DECAHEXA pattern.

The first compressor 150b may generate the second image data IDT2 having a TETRA pattern based on the image data IDT. In some embodiments, the first compressor 150b may compresses each pixel group PG1 of FIG. 21 including pixels arranged in 4×4 in the image data IDT in the manner described above in FIG. 5 to generate the second image data IDT2 of the TETRA pattern including pixel groups PG1' of FIG. 21 including pixels arranged 2×2.

With respect to each pixel group PG1 including the pixels arranged in 4×4 in the image data IDT, the first compressor 150*b* may calculate a representative pixel value (e.g., an average value or a median value) of each of the pixels arranged 2×2 in the pixel group PG1'. In this case, the first compressor 150*b* may also calculate residual values between the representative pixel value and the pixels arranged 2×2. In addition, the first compressor 150*b* may generate the second image data IDT2 arranged 2×2 having the calculated representative pixel values. Also, the first compressor 150*b* may generate third compressed data CDT3 based on the residual values. In addition, the first compressor 150*b* may transmit the generated second image data IDT2 and third compressed data CDT3 to the second compressor 120*b*.

The second compressor 120*b* may generate the first compressed data CDT1 and the second compressed data CDT2 based on the second image data IDT2, and transmit The first compressed data CDT1 and the second compressed data CDT2 together with the third compressed data CDT3 received from the first compressor 150*b* to the image processing device 200*b*.

The decompressor 230*b* may generate a low resolution image or a high resolution image based on the received first to third compressed data CDT1 to CDT3. For example, the decompressor 230*b* may generate the low resolution image based on the first compressed data CDT1, a medium resolution image having a higher resolution than that of the low resolution image based on the first compressed data CDT1 and the second compressed data CDT2, and a high resolution image based on the first to third compressed data CDT1 to CDT3. A method, performed by the decompressor 230*b*, of generating the high resolution image based on the third compressed data CDT3 may be substantially the same as the method described above with reference to FIG. 18, and thus, a redundant description thereof is omitted.

Figure 22:
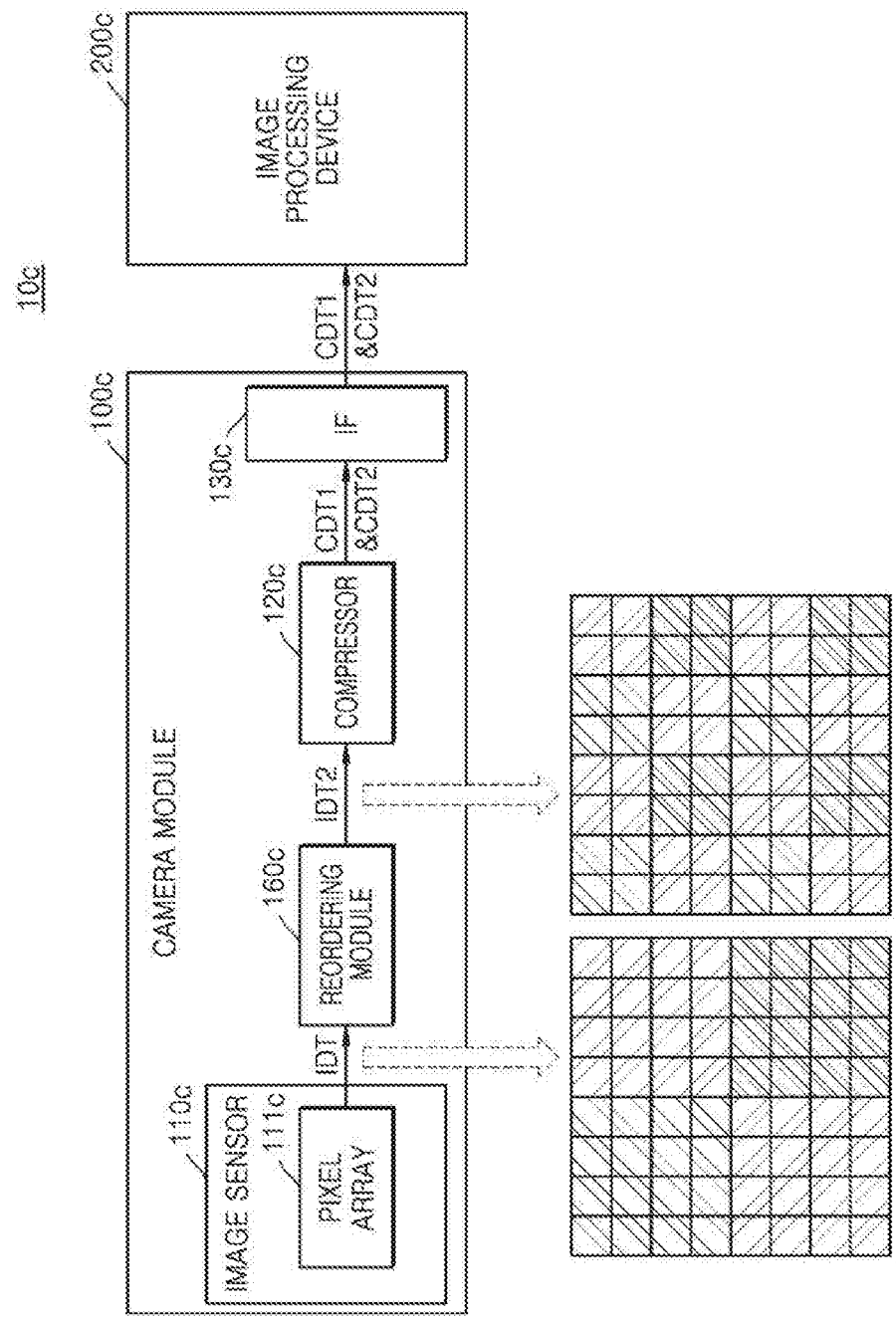
FIG. 22 is a diagram illustrating a camera module according to embodiments.

With reference to FIG. 22, the image sensor 110*b* is illustrated and described to generate the image data IDT of the DECAHEXA pattern, but the embodiments are not limited thereto. For example, the image sensor 110*b* may generate the image data IDT in which a red pixel group arranged in 2n (n is a positive integer)×2n, two green pixel groups arranged in 2n×2n, and a blue pixel group arranged in 2n×2n are repeatedly arranged.

Alternatively, the image sensor 110*b* may generate the image data IDT in which a red pixel group arranged in 3n (n is a positive integer)×3n, two green pixel groups arranged in 3n×3n, and a blue pixel group arranged in 3n×3n are repeatedly arranged. In this case, the first compressor 150*b* may generate the third compressed data CDT having a NONA pattern through the above-described method based on the image data IDT.

FIG. 22 is a diagram illustrating a camera module 100*c* according to embodiments. FIG. 22 is a diagram illustrating the camera module 100*c* of an image processing system 10*c* that is a modifiable embodiment of the image processing system 10 of FIG. 1.

Referring to FIG. 22, the image processing system 10*c* may include the camera module 100*c* and an image processing device 200*c*. In an embodiment, the camera module 100*c* may include the image sensor 110*c*, a reordering module 160*c*, a compressor 120*c*, and an interface (IF) 130*c*. The camera module 100*c* of FIG. 22 may further include the reordering module 160*c* when compared with the camera module 100 of FIG. 1. The image sensor 110*c*, the second compressor 120*c*, and the interface 130*c* of FIG. 22 may operate similarly to the image sensor 110, the compressor 120, and the interface 130 of FIG. 1, respectively, and thus redundant descriptions with those described with reference to FIG. 1 above are omitted.

In some embodiments, the pixel array 111*b* of the image sensor 110*b* may include the color filter of the DECAHEXA pattern described above in FIG. 22. In addition, the image sensor 110*b* may generate the image data IDT of the DECAHEXA pattern.

Figure 23:
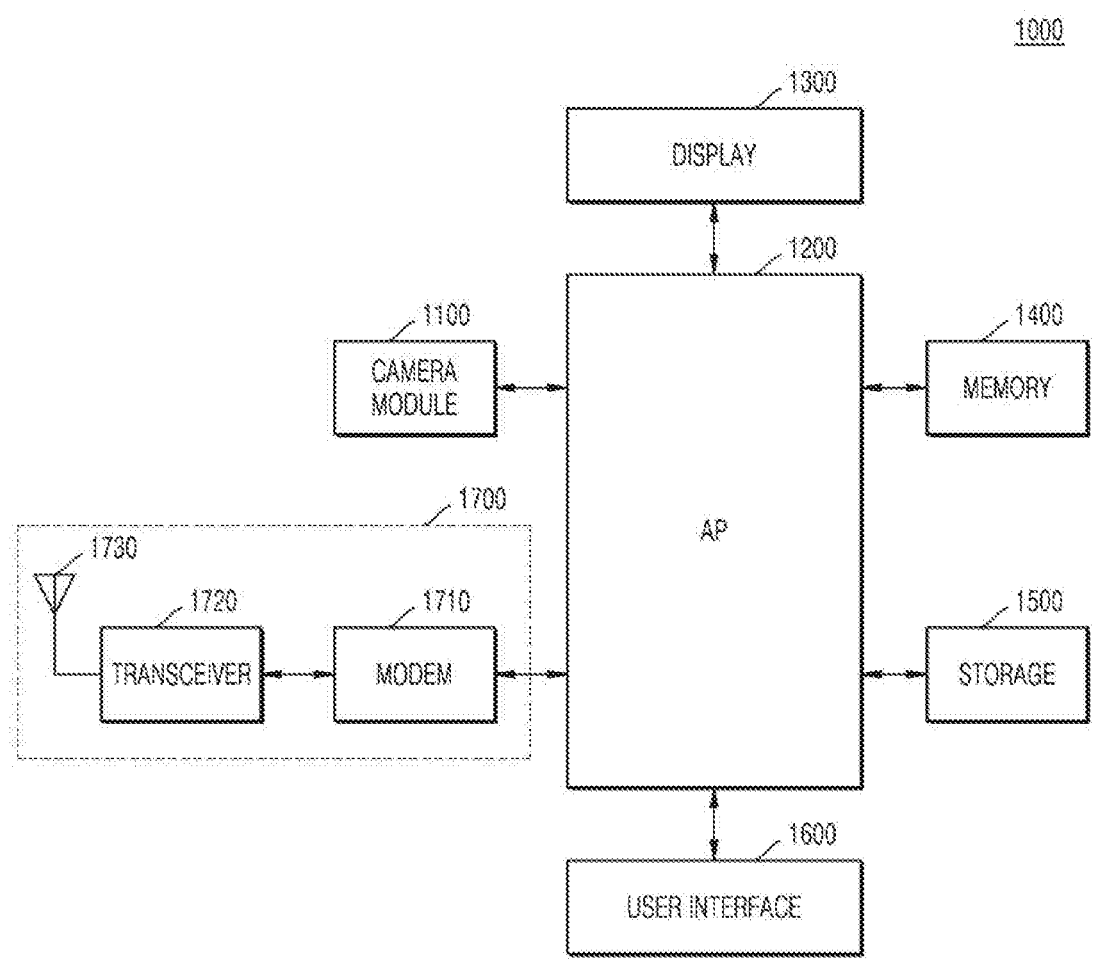
FIG. 23 is a diagram illustrating an electronic device according to embodiments.

The reordering module 160*c* may generate the second image data IDT2 of a TETRA pattern by rearranging the image data IDT of the DECAHEXA pattern. The reordering module 160*c* does not perform compression on the image data IDT, and may only perform relocation. For example, the reordering module 160*c* may generate the second image data IDT2 by rearranging the image data IDT including a red pixel group arranged in 4×4, two green pixel groups, and a blue pixel group to the TETRA pattern in which a red pixel group arranged 2×2, two green pixel groups and a blue pixel group are repeatedly arranged. The reordering module 160*c* may transmit the generated second image data IDT2 to the compressor 120*c*. The compressor 120*c* may generate the first compressed data CDT1 and the second compressed data CDT2 based on the second image data IDT2. With reference to FIG. 23, the image sensor 110*c* is illustrated and described to generate the image data IDT of the DECAHEXA pattern, but the embodiments are not limited thereto. For example, the image sensor 110*c* may generate the image data IDT in which a red pixel group arranged in 2n (n is a positive integer)×2n, two green pixel groups arranged in 2n×2n, and a blue pixel group arranged in 2n×2n are repeatedly arranged.

Alternatively, the image sensor 110*c* may generate the image data IDT in which a red pixel group arranged in 3n (n is a positive integer)×3n, two green pixel groups arranged in 3n×3n, and a blue pixel group arranged in 3n×3n are repeatedly arranged. In this case, the reordering module 160*c* may generate the second image data IDT having a NONA pattern through the above-described method based on the image data IDT. embodiments.

FIG. 23 is a diagram illustrating an electronic device 1000 according to Referring to FIG. 23, the electronic device 1000 may include a camera module 1100, an application processor (AP) 1200, a display 1300, a memory 1400, a storage 1500, a user interface 1600, and a wireless transceiver 1700. The camera module 1100 of FIG. 23 may correspond to the camera module 100 of FIG. 1, the camera module 100*a* of FIG. 19, the camera module 100*b* of FIG. 21, or the camera module 100*c* of FIG. 22. The application processor 1200 of FIG. 23 may include the image processing device 200 of FIG. 1 or the image processing device 200*a* of FIG. 19. In FIGS. 1, 19, 21, and 22, redundant descriptions with those described above are omitted.

The application processor 1200 controls the overall operation of the electronic device 1000 and may be provided as a system-on-chip (SoC) that drives an application program, an operating system, etc. The application processor 1200 may receive first compressed data used for generating a low resolution image (e.g., a preview image) and second compressed data used for generating a high resolution image (e.g., a full resolution image) from the camera module 1100, generate low resolution image data based on the first compressed data, or generate high resolution image data based on the first compressed data and the second compressed data. In some embodiments, the application processor 1200 may store the first compressed data and the second compressed data in the memory 1400 or the storage 1500. In some embodiments, the application processor 1200 may store the low resolution image data and the high resolution image data in the memory 1400 or the storage 1500.

The memory 1400 may store programs and/or data processed or executed by the application processor 1200. The storage 1500 may be implemented as a nonvolatile memory device such as a NAND flash or a resistive memory. For example, the storage 1500 may be provided as a memory card (MMC, eMMC, SD, micro SD) or the like. The storage 1500 may store data and/or programs for execution algorithms that control the image processing operation of the application processor 1200, and data and/or programs may be loaded into the memory 1400 when the image processing operation is performed.

The user interface 1600 may be implemented as various devices capable of receiving a user input, such as a keyboard, a curtain key panel, a touch panel, a fingerprint sensor, a microphone, etc. The user interface 1600 may receive the user input and provide a signal corresponding to the received user input to the application processor 1200. The wireless transceiver 1700 may include a modem 1710, a transceiver 1720, and an antenna 1730.

Figure 24:
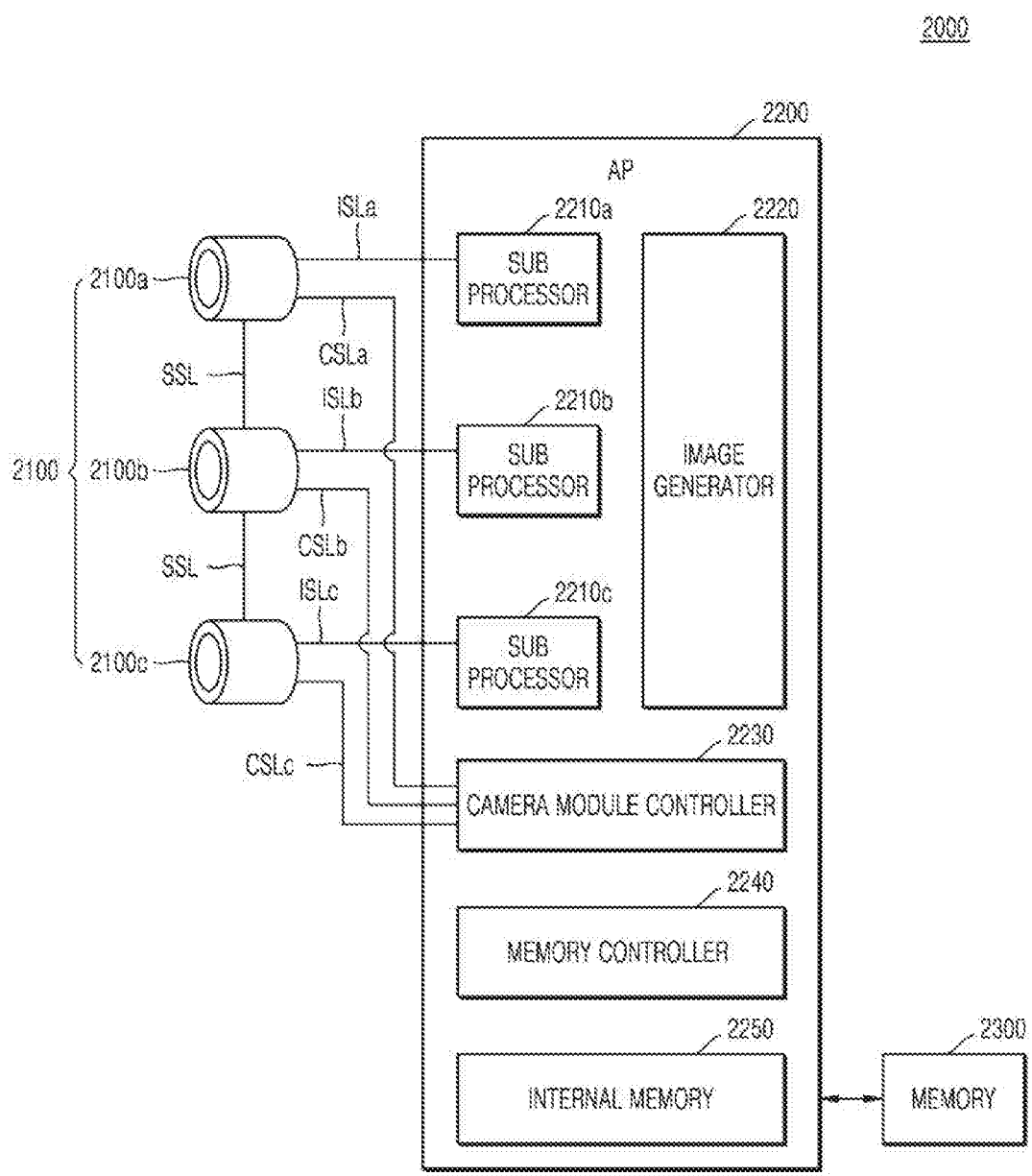
FIG. 24 is a diagram illustrating a part of an electronic device according to embodiments.
Figure 25:
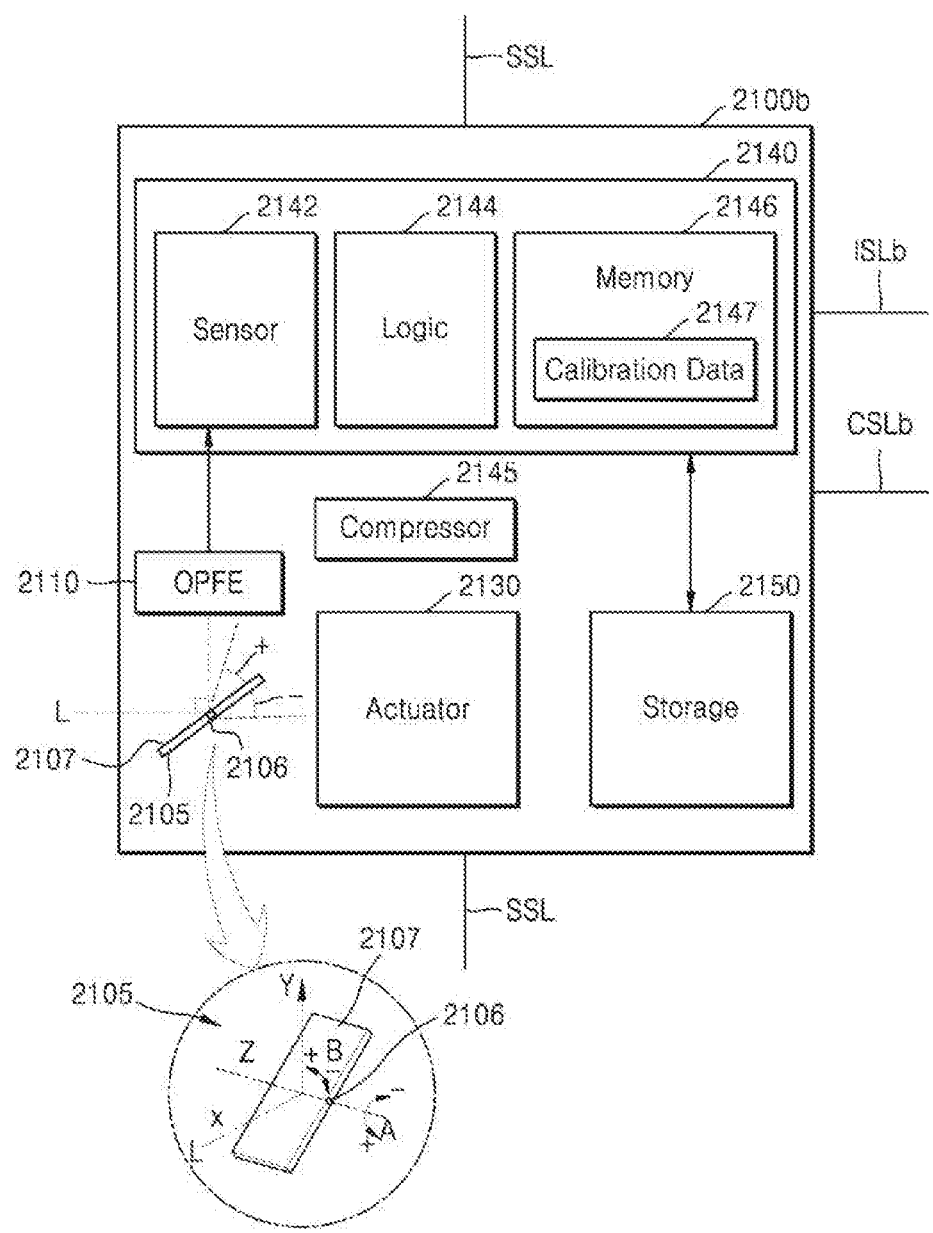
FIG. 25 is a diagram illustrating a detailed configuration of a camera module according to embodiments.

FIG. 24 is a diagram illustrating a part of an electronic device 2000 according to embodiments. FIG. 25 is a diagram illustrating a detailed configuration of a camera module 2100b according to embodiments. FIG. 24 is a diagram illustrating the electronic device 2000 as a part of the electronic device 1000 of FIG. 23, and FIG. 25 is a diagram illustrating the detailed configuration of the camera module 2100b of FIG. 24.

Referring to FIG. 24, the electronic device 2000 may include a multi-camera module 2100, an application processor (AP) 2200, and a memory 2300. The memory 2300 may perform the same function as the memory 1400 illustrated in FIG. 23, and thus, a redundant description is omitted.

The electronic device 2000 may capture and/or store an image of a subject using a CMOS image sensor, and may be implemented as a mobile phone, a tablet computer, or a portable electronic device. The portable electronic device may include a laptop computer, a mobile phone, a smart phone, a tablet PC, a wearable device, etc. The electronic device 2000 may capture and/or store an image of an object by using a CMOS image sensor, and may be implemented as a mobile phone, a tablet computer, or a portable electronic device. The portable electronic device may include a laptop computer, a mobile phone, a smartphone, a tablet PC, a wearable device, etc.

The multi-camera module 2100 may include a first camera module 2100a, a second camera module 2100b, and a third camera module 2100c. The multi-camera module 2100 may perform the same function as the camera module 100 of FIG. 1, the camera module 100a of FIG. 19, the camera module 100b of FIG. 21, or the camera module 100c of FIG. 22. Although in FIG. 24 the multi-camera module 2100 is shown as including the three camera modules 1100a to 1100c, the embodiments are not limited thereto, and various number of camera modules may be included in the multi-camera module 2100.

Hereinafter, the detailed configuration of the camera module 2100b will be described in more detail with reference to FIG. 25, but the following description may be equally applied to other camera modules 2100a and 2100c according to an embodiment.

Referring to FIG. 25, the second camera module 2100b may include a prism 2105, an optical path folding element (hereinafter, "OPFE") 2110, an actuator 2130, an image sensing device 2140, and a storage 2150.

The prism 2105 may include a reflective surface 2107 of a light reflecting material to modify the path of light L incident from the outside.

According to an example embodiment, the prism 2105 may change the path of light L incident in the first direction X to the second direction Y perpendicular to the first direction X. Also, the prism 2105 may rotate the reflective surface 2107 of the light reflecting material in an A direction or a B direction around a center axis 1106, thereby changing the path of the light L incident in the first direction X to the second direction Y perpendicular to the first direction X. At this time, the OPFE 2110 may also move in a third direction Z perpendicular to the first direction X and second direction Y.

In the example embodiment, the maximum rotatable angle of the prism 2105 in the direction A may be less than or equal to 15 degrees in the positive (+) A direction and may be greater than 15 degrees in the negative (−) A direction. However, embodiments are not limited thereto.

In an example embodiment, prism 2105 may be rotated by around 20 degrees, between 10 degrees and 20 degrees, or between 15 degrees and 20 degrees in the positive (+) or negative (−) B direction. Here, the prism 2105 may be rotated by the same angle or similar angles that are different from each other by around 1 degree in the positive (+) B direction and the negative (−) B direction.

In an example embodiment, the prism 2105 may move the reflective surface 2106 of the light reflecting material in the third direction (e.g., a Z direction) parallel to the direction in which the center axis 2106 extends.

For example, the OPFE 2110 may include optical lenses including m (where m is a natural number) groups. m lenses may move in the second direction Y and change the optical zoom ratio of the camera module 2100b. For example, when the basic optical zoom ratio of the camera module 2100b is Z and the m optical lenses included in the OPFE 2110 are moved, the optical zoom ratio of the camera module 2100b may be changed to 3Z, 5Z, or an optical zoom ratio higher than 5Z.

The actuator 2130 may move the OPFE 2110 or optical lenses (hereinafter referred to as an optical lens) to a position. For example, the actuator 2130 may adjust the position of the optical lens, such that the image sensor 2142 is positioned at the focal length of the optical lens for accurate sensing.

The image sensing device 2140 may include an image sensor 2142, a control logic 2144, an encoder 2145, and a memory 2146. The image sensor 2142 may sense an image of a sensing target using light L provided through an optical lens. The image sensor 2142 of FIG. 25 may be functionally similar to the image sensor 110 of FIG. 1 or the image sensor 110a of FIG. 19, and thus, a redundant description is omitted. The control logic 2144 may control the overall operation of the second camera module 2100b. For example, the control logic 2144 may control an operation of the second camera module 2100b according to a control signal provided through a control signal line CSLb.

The compressor 2145 may encode sensed image data. The compressor 2145 of FIG. 25 may perform a function similar to that of the compressor 120 of FIG. 1, the compressor 120a of FIG. 19, the compressor 120b of FIG. 21, or the compressor 120c of FIG. 22, and thus, a redundant description is omitted. For convenience of description, the compressor 2145 is illustrated as an individual functional unit different from other functional units, but is not limited thereto, and may be included in the control logic 2144 to compress and encode image data.

The memory 2146 may store information for the operation of the second camera module 2100b, e.g., calibration data 2147. The calibration data 2147 may include information for the second camera module 2100b to generate image data by using the light L provided from the outside. The calibration data 2147 may include, for example, information about a degree of rotation described above, information about a focal length, information about an optical axis, etc. When the second camera module 2100b is implemented in the form of a multi-state camera in which the focal length is changed depending on the position of the optical lens, the calibration data 2147 may include focal distance values for respective positions (or states) of the optical lens and information related to auto focusing.

The storage 2150 may store image data sensed through the image sensor 2142. The storage 2150 may be provided outside the image sensing device 2140 and may be stacked with a sensor chip constituting the image sensing device 2140. In an example embodiment, the storage 2150 may be implemented with an EEPROM, but embodiments are not limited thereto.

Referring to FIGS. 24 and 25 together, in an example embodiment, one camera module (e.g., first camera module 2100a) from among a plurality of camera modules 2100a, 2100b, and 2100c may include four sub-pixels that are adjacent to one another and share the same color information in one color pixel (i.e., tetra cell), and another camera module (e.g., the second camera module 2100b) may include nine sub-pixels that are adjacent to one another and share the same color information in one color pixel (i.e., nona cell). However, embodiments are not limited thereto.

In an example embodiment, the camera modules 2100a, 2100b, and 2100c may each include an actuator 2130. Therefore, the camera modules 2100a, 2100b, and 2100c may include the same or different calibration data 2147 according to the operation of actuators 2130 included therein.

In an example embodiment, one camera module (e.g., the second camera module 2100b) from among the camera modules 2100a, 2100b, and 2100c may be a folded lens type camera module including the prism 2105 and the OPFE 2110 as described above, and the other camera modules (e.g., 2100a and 2100c) may be vertical type camera module without the prism 2105 and the OPFE 2110. However, embodiments are not limited thereto.

In an example embodiment, one camera module (e.g., a third camera module 2100c) from among the camera modules 2100a, 2100b, and 2100c may be a vertical type depth camera that extracts depth information by using an infrared ray (IR), for example. In this case, the AP 2200 may generate a 3D depth image by merging image data provided from such a depth camera with image data provided from another camera module (e.g., the first camera module 2100a or the second camera module 2100b).

In an example embodiment, at least two camera modules (e.g., first camera module 2100a and second camera module 2100b) from among the camera modules 2100a, 2100b, and 2100c may have different field of views (FOVs). In this case, for example, at least two camera modules (e.g., the first camera module 2100a and the second camera module 2100b) from among the camera modules 2100a, 2100b, and 2100c may have different optical lenses, but the embodiments are not limited thereto. For example, the first camera module 2100a from among the camera modules 2100a, 2100b, and 2100c may have a smaller FOV than the second camera module 2100b and the third camera module 2100c. However, the embodiments are not limited thereto, and the multi camera module 2100 may further include a camera module having a larger FOV than originally used camera modules 2100a, 2100b, and 2100c.

Furthermore, in some embodiments, the camera modules 2100a, 2100b, and 2100c may be different FOVs from one another. In this case, optical lenses included in the camera modules 2100a, 2100b, and 2100c may also be different from one another, but the embodiments are not limited thereto.

In some embodiments, the camera modules 2100a, 2100b, and 2100c may be physically separated from one another. In other words, the camera modules 2100a, 2100b, and 2100c do not divide and use the sensing area of one image sensor 2142. Rather, an independent image sensor 2142 may be provided inside each of the camera modules 2100a, 2100b, and 2100c.

The AP 2200 may include a plurality of sub-processors 2210a, 2210b, and 2210c, a camera module controller 2230, a memory controller 2240, and an internal memory 2250. The AP 2200 may be implemented separately from the camera modules 2100a, 2100b, and 2100c. For example, the AP 2200 and the camera modules 2100a, 2100b, and 2100c may be implemented separately from each other as separate semiconductor chips.

Image data generated by the camera module 2100a, 2100b, and 2100c may be respectively provided to corresponding sub-processors 2210a, 2210b, and 2210c through image signal lines ISLa, ISLb, and ISLc separated from one another. For example, image data generated from the first camera module 2100a may be provided to a first sub-processor 2210a through a first image signal line ISLa, image data generated from the second camera module 2100b may be provided to a second sub-processor 2210b through a second image signal line ISLb, and image data generated from the third camera module 2100c may be provided to a third sub-processor 2210c through a third image signal line ISLc The transmission of image data may be performed by using a camera serial interface based on the MIPI, but embodiments are not limited thereto.

In an example embodiment, one sub-processor may be provided to correspond to a plurality of camera modules. For example, the first sub-processor 2210a and the third sub-processor 2210c may be integrally implemented as a single sub-processor instead of being implemented separate from each other, and image data provided from the first camera module 2100a and the third camera module 2100c may be selected by a selecting element (e.g., a multiplexer) and provided to an integrated sub-image processor.

Each of the sub processors 2210a, 2210b, and 2210c may include the decompressor 230 of FIG. 1, the decompressor 230a of FIG. 19, or the decompressor 230b of FIG. 21. The sub processors 2210a, 2210b, and 2210c may decompress the received compressed data to generate decompressed data, and output the generated decompressed data to the image generator 2220. The image generator 2220 may correspond to the image signal processor 240 of FIG. 1 or the image signal processor 240a of FIG. 19. That is, the image generator 2220 may generate low resolution image data or high resolution image data based on the decompressed data.

The camera module controller 2230 may provide a control signal to each of the camera module 2100a, 2100b, and 2100c. A control signal generated from the camera module controller 2230 may be provided to corresponding camera modules 2100a, 2100b, and 2100c through control signal lines CSLa, CSLb, and CSLc separated from one another.

Figure 26:
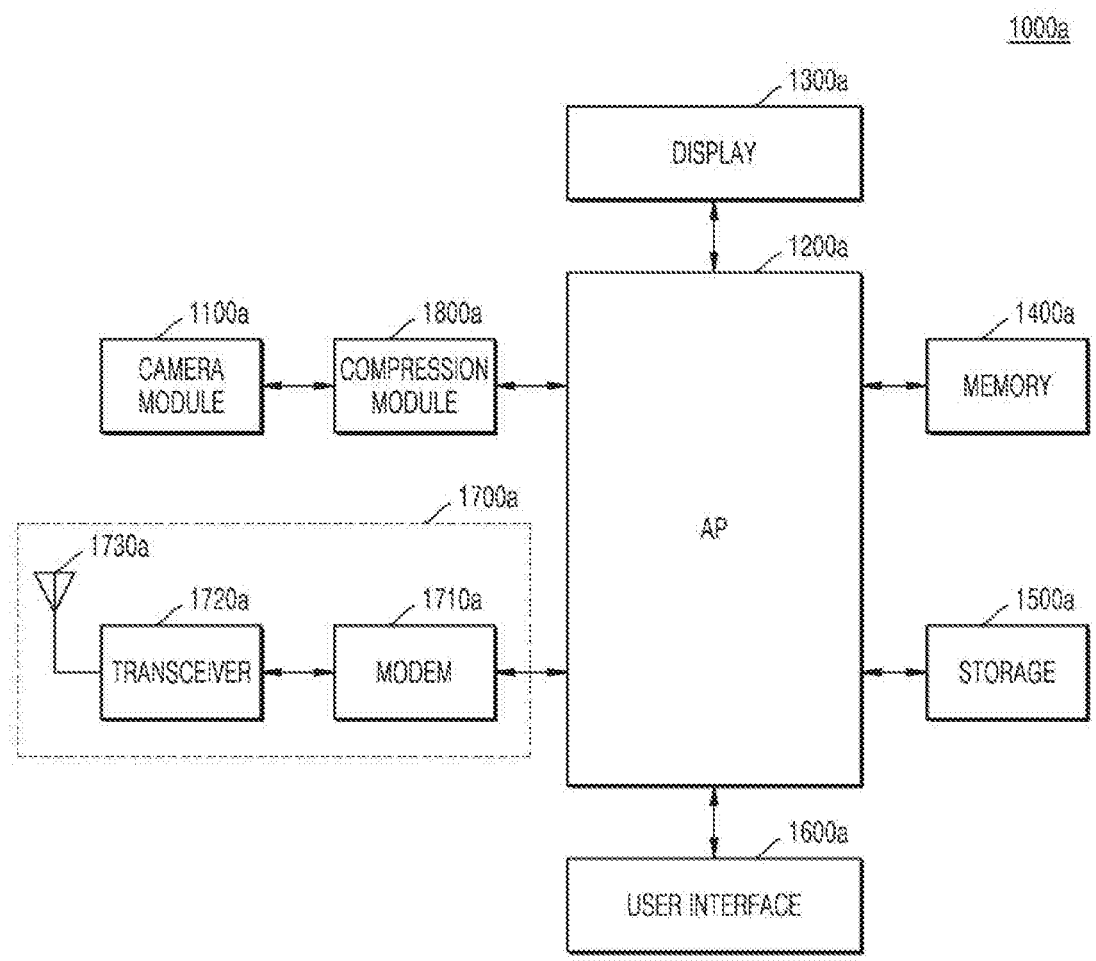
FIG. 26 is a diagram illustrating an electronic device according to embodiments.

FIG. 26 is a diagram illustrating an electronic device 1000a according to embodiments. In detail, FIG. 26 is a diagram illustrating a modifiable embodiment of the electronic device 1000 of FIG. 23.

Referring to FIG. 26, the electronic device 1000a may include a camera module 1100a, an application processor (AP) 1200a, a display 1300a, a memory 1400a, a storage 1500a, a user interface 1600a, and a wireless transceiver 1700a, and a compression module 1800a. The wireless transceiver 1700a may include a modem 1710a, a transceiver 1720a, and an antenna 1730a. The display 1300a, the memory 1400a, the storage 1500a, the user interface 1600a, and the wireless transceiver 1700a of FIG. 26 may respectively correspond to the display 1300, the memory 1400, the storage 1500, and the user interface 1600 and the wireless transceiver 1700 of FIG. 23.

Upon comparing the electronic device 1000 of FIG. 23 with the electronic device 1000a of FIG. 26, there is a difference in that the electronic device 1000a of FIG. 26 includes an image sensor photographing a subject and a compressor compressing image data generated by the image sensor as separate configurations.

The camera module 1100 of FIG. 23 may photograph a subject to generate image data, generate compressed data used for generating images having different resolutions based on the image data using an internal compressor (e.g., the compressor 2145 of FIG. 25), and transmit the generated compressed data to the application processor 1200.

The camera module 1100a of FIG. 26 may photograph the subject to generate image data, and may transmit the generated image data to the compression module 1800a. The compression module 1800a may include a compressor and may generate compressed data used to generate the images having different resolutions based on the received image data using the compressor. For example, the compression module 1800a may include any one or any combination of the compressor 120 of FIG. 1, the compressor 120a of FIG. 19, the first compressor 150b and the second compressor 120b of FIG. 21, and the reordering module 160c and the compressor 120c of FIG. 22. Redundant descriptions with those described above with reference to FIGS. 1, 19, 21, and 22 are omitted.

In addition, the compression module 1800a may transmit the generated compressed data to the application processor 1200a. The application processor 1200a may include a decompressor and may generate decompressed data based on the received compressed data using the decompressor. For example, the application processor 1200a may include any one or any combination of the decompressor 230 of FIG. 1, the decompressor 230a of FIG. 20, and the decompressor 230b of FIG. 21. Redundant descriptions with those described above with reference to FIGS. 1, 20, and 21 are omitted. In addition, the application processor 1200a may generate low resolution image data or high resolution image data based on the decompressed data.

However, the embodiments are not limited thereto, and according to an embodiment, the compression module 1800a may be implemented to further include not only the compressor but also the decompressor. For example, the compression module 1800a may be implemented to further include any one or any combination of the decompressor 230 of FIG. 1, the decompressor 230a of FIG. 20, and the decompressor 230b of FIG. 21. In this case, the compression module 1800a may decompress the compressed data using the decompressor to generate the decompressed data, and transmit the generated decompressed data to the application processor 1200a. The application processor 1200a may generate low resolution image data or high resolution image data based on the decompressed data.

In an embodiment, the camera module 1100a, the compression module 1800a, and the application processor 1200a may be implemented separately from each other as separate semiconductor chips.

Figure 27:
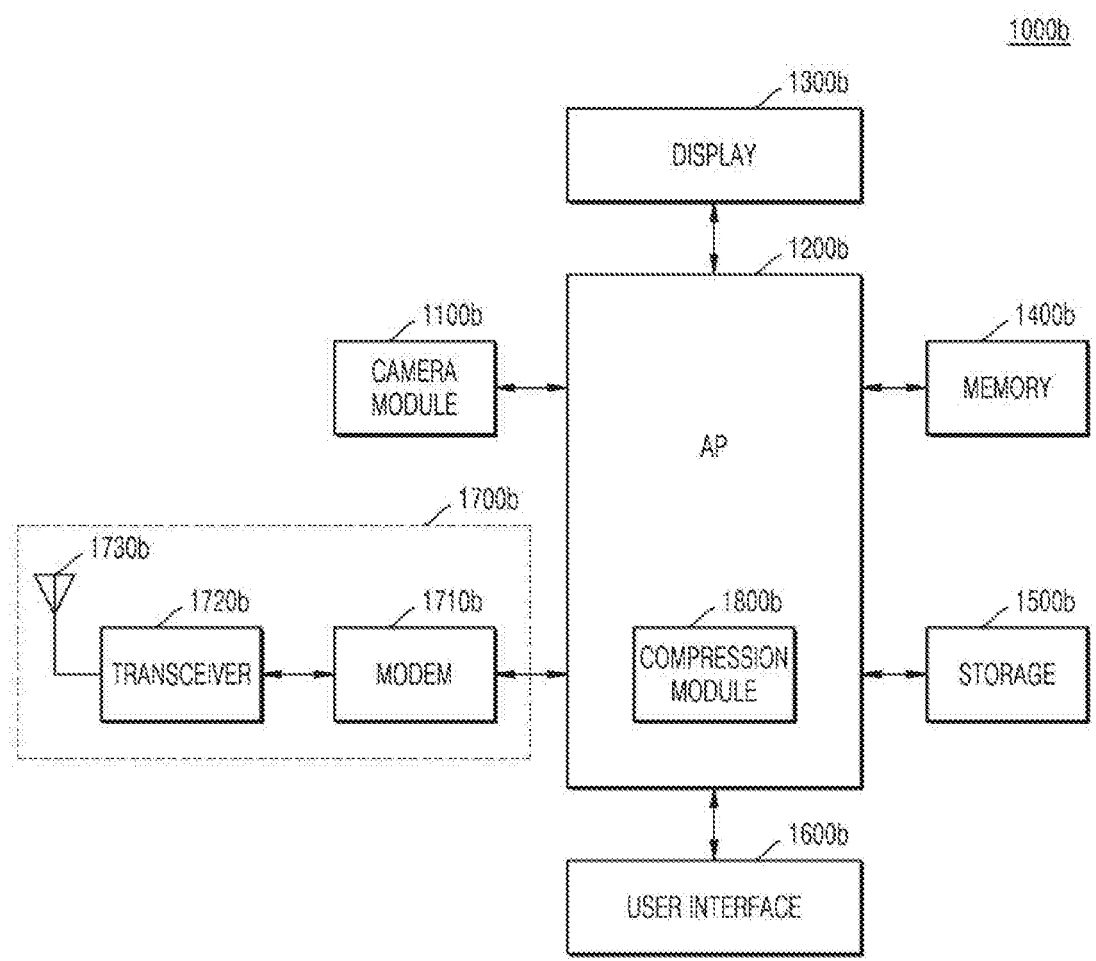
FIG. 27 is a diagram illustrating an electronic device according to embodiments.

FIG. 27 is a diagram illustrating an electronic device 1000b according to embodiments. In detail, FIG. 27 is a diagram illustrating a modifiable embodiment of the electronic device 1000a of FIG. 26.

Referring to FIG. 27, the electronic device 1000b may include a camera module 1100b, an application processor (AP) 1200b, a display 1300b, a memory 1400b, a storage 1500b, a user interface 1600b, and a wireless transceiver 1700b. In addition, the application processor 1200b may include a compression module 1800b. The wireless transceiver 1700b may include a modem 1710b, a transceiver 1720b, and an antenna 1730b. The camera module 1100b, the display 1300b, the memory 1400b, the storage 1500b, the user interface 1600b and the wireless transceiver 1700b of FIG. 27 may respectively correspond to the camera module 1100a, the display 1300a, the memory 1400a, the storage 1500a, the user interface 1600a, and the wireless transceiver 1700a.

Upon comparing the electronic device 1000a of FIG. 26 with the electronic device 1000b of FIG. 27, the electronic device 1000b of FIG. 27 differs in that the compression module 1800b is included in the application processor 1200b.

The camera module 1100b of FIG. 27 may photograph a subject to generate image data, and may transmit the generated image data to the application processor 1200b. In addition, the application processor 1200b may generate compressed data used to generate images having different resolutions based on the received image data using the compression module 1800b. The compression module 1800b may correspond to the compression module 1800a of FIG. 26 and may include a compressor. In FIG. 26, redundant descriptions with the above descriptions are omitted.

The compression module 1800b may include not only the compressor but also a decompressor that generates decompressed data based on the compressed data. In this case, the application processor 1200b may decompress the compressed data using the compression module 1800b to generate the decompressed data. In addition, the application processor 1200b may generate low resolution image data or high resolution image data based on the decompressed data. Redundant descriptions with those described above with reference to FIGS. 1, 20, and 21 are omitted.

In an embodiment, the camera module 1100b and the application processor 1200b may be implemented separately from each other as separate semiconductor chips.

While inventive concepts have been shown and described with reference to embodiments thereof, it will be understood that various changes in form and details may be made therein without departing from the spirit and scope of the following claims.

What is claimed is:

1. A camera module comprising:
    an image sensor configured to generate image data comprising a plurality of pixels;
    a memory;
    a compressor configured to:
        divide the plurality of pixels included in the generated image data, into a plurality of pixel groups;
        with respect to each of the plurality of pixel groups into which the plurality of pixels is divided, calculate a representative pixel value of a corresponding pixel group, based on pixel values of multiple pixels included in the corresponding pixel group such that a single representative pixel value is calculated for each of the plurality of pixel groups;

store first compressed data generated based on the calculated representative pixel value of each of the plurality of pixel groups in the memory;

with respect to each of the plurality of pixel groups into which the plurality of pixels is divided, calculate residual values representing differences between the pixel values of the multiple pixels included in the corresponding pixel group and the representative pixel value of the corresponding pixel group; and store second compressed data generated based on the calculated residual values of each of the plurality of pixel groups in the memory; and an interface configured to:

based on receiving a request for an image having a first resolution, read the stored first compressed data from the memory, and output the read first compressed data; and based on receiving a request for an image having a second resolution higher than the first resolution, read the stored first compressed data and the stored second compressed data from the memory, and output the read first compressed data and the read second compressed data.

2. The camera module of claim 1, wherein the compressor is further configured to:

divide the plurality of pixels into the plurality of pixel groups disposed adjacent to each other and respectively comprising pixels having same color information; and with respect to each of the plurality of pixel groups into which the plurality of pixels is divided:

calculate an average value of the pixel values of the multiple pixels included in the corresponding pixel group; and determine the calculated average value as the representative pixel value of the corresponding pixel group.

3. The camera module of claim 1, wherein the compressor is further configured to:

with respect to each of the plurality of pixel groups into which the plurality of pixels is divided, determine a predicted value of the corresponding pixel group, based on any one or any combination of pixel values of pixels included in a pixel group that is compressed before the corresponding pixel group; and generate the first compressed data, based on the determined predicted value of each of the plurality of pixel groups and target pixel values.

4. The camera module of claim 3, wherein the compressor is further configured to, with respect to each of the plurality of pixel groups into which the plurality of pixels is divided, determine a representative pixel value of the pixel group compressed before the corresponding pixel group, as the predicted value of the corresponding pixel group.

5. The camera module of claim 3, wherein the compressor is further configured to:

with respect to each of the plurality of pixel groups into which the plurality of pixels is divided:

calculate a difference value indicating a difference between the predicted value of the corresponding pixel group and the target pixel values;

convert the calculated difference value into a reference value that is expressed in a predetermined number of bits; and calculate a loss value indicating a degree of data loss due to the difference value being converted into the reference value; and generate the first compressed data comprising the calculated loss value of each of the plurality of pixel groups and the reference value of each of the plurality of pixel groups.

6. The camera module of claim 5, wherein the compressor is further configured to, with respect to each of the plurality of pixel groups into which the plurality of pixels is divided:

check whether the calculated difference value is included in an integer range that is expressed in the predetermined number of bits;

based on the difference value being checked to be included in the integer range, generate the first compressed data; and based on the difference value being checked to be not included in the integer range, shift right the difference value, and increase the calculated loss value.

7. The camera module of claim 3, wherein the compressor is further configured to, with respect to each of the plurality of pixel groups into which the plurality of pixels is divided:

among the pixel values of the pixel group compressed before the corresponding pixel group, check a pixel value that is most similar to the representative pixel value of the corresponding pixel group; and determine the checked pixel value as the predicted value of the corresponding pixel group.

8. The camera module of claim 3, wherein the compressor is further configured to:

with respect to each of the plurality of pixel groups into which the plurality of pixels is divided:

generate a flag indicating a relative position between the corresponding pixel group and a pixel having the predicted value;

calculate a difference value indicating a difference between the predicted value of the corresponding pixel group and the target pixel values;

convert the calculated difference value into a reference value that is expressed in a predetermined number of bits; and calculate a loss value indicating a degree of data loss due to the difference value being converted into the reference value; and generate the first compressed data comprising the calculated loss value of each of the plurality of pixel groups, the generated flag of each of the plurality of pixel groups and the reference value of each of the plurality of pixel groups.

9. The camera module of claim 1, wherein the compressor is further configured to, for each of the plurality of pixel groups, compare the representative pixel value of the pixel group to a predicted value of the pixel group to generate the first compressed data.

10. An image processing device comprising:

an interface configured to receive compressed data that is obtained by compressing image data comprising a plurality of pixel groups, in a unit of a pixel group;

a memory storing the received compressed data;

a decompressor configured to decompress at least a part of the stored compressed data to generate decompressed data; and an image signal processor configured to perform image processing, based on the generated decompressed data, to generate reconstructed image data including first image data having a first resolution and second image data having a second resolution, wherein the compressed data comprises first compressed data that is used to generate the first image data and the second image data, and second compressed data that is used to generate the second image data, wherein the interface is configured to:
based on receiving a request for the first image data, request the first compressed data to a camera module and transmit the received first compressed data from the camera module to the memory; and
based on receiving a request for the second image data, request the first compressed data and the second compressed data to the camera module and transmit the received first compressed data and the second compressed data from the camera module to the memory, and wherein the first compressed data is based on a calculated representative pixel value of each of the plurality of pixel groups, the representative pixel value being calculated based on pixel values of multiple pixels included in a corresponding pixel group such that a single representative pixel value is calculated for each of the plurality of pixel groups.

11. The image processing device of claim 10, wherein the decompressor is further configured to, based on receiving a request for the first image data, read the first compressed data from the memory and decompress the read first compressed data to generate first decompressed data, and wherein the image signal processor is further configured to perform image processing, based on the generated first decompressed data, to generate the first image data.

12. The image processing device of claim 11, wherein the first compressed data comprises a loss value indicating a degree of data loss due to compression of each of the plurality of pixel groups and a reference value that is a result of compressing the representative pixel values respectively representing the plurality of pixel groups, and wherein the decompressor is further configured to:
calculate the representative pixel value of each of the plurality of pixel groups, based on the loss value of each of the plurality of pixel groups and the reference value; and
generate the first decompressed data comprising the calculated representative pixel value of each of the plurality of pixel groups.

13. The image processing device of claim 12, wherein the decompressor is further configured to, based on receiving a request for the second image data, read the first compressed data from the memory and the second compressed data, and decompress the read first compressed data and the read second compressed data to generate second decompressed data, and wherein the image signal processor is further configured to perform image processing, based on the generated second decompressed data, to generate the second image data.

14. The image processing device of claim 13, wherein the second compressed data comprises, with respect to each of the plurality of pixel groups, residual values representing differences between pixel values of pixels included in a corresponding pixel group and the representative pixel value of the corresponding pixel group, and wherein the decompressor is further configured to:
calculate pixel values of pixels included in each of the plurality of pixel groups, based on the calculated representative pixel value and the calculated residual values of each of the plurality of pixel groups; and
generate the second decompressed data comprising the calculated pixel values of each of the plurality of pixel groups.

15. A camera module comprising:
an image sensor configured to generate image data comprising a plurality of pixels;
a first compressor configured to:
divide the plurality of pixels included in the generated image data, into a plurality of first pixel groups;
with respect to each of a plurality of first pixel groups into which the plurality of pixels is divided, calculate a first representative pixel value of a corresponding pixel group, based on pixel values of multiple pixels included in the corresponding pixel group;
generate target image data, based on the calculated first representative pixel value of each of the plurality of first pixel groups;
with respect to each of the plurality of first pixel groups, calculate first residual values representing differences between the pixel values of the multiple pixels included in the corresponding pixel group and the first representative pixel value of the corresponding pixel group; and
generate first compressed data, based on the calculated first residual values of each of the plurality of first pixel groups;
a second compressor configured to:
receive the target image data and the first compressed data from the first compressor; and
with respect to each of a plurality of second pixel groups generated by compressing each of the first pixel groups, generate second compressed data and third compressed data, based on the target image data; and
an interface configured to output the generated first compressed data, the generated second compressed data, and the generated third compressed data.

16. The camera module of claim 15, wherein the second compressor is further configured to:
with respect to each of the plurality of second pixel groups, calculate a second representative pixel value of a corresponding pixel group, based on pixel values of multiple pixels included in the corresponding pixel group;
generate the second compressed data, based on the calculated second representative pixel value of each of the plurality of second pixel groups;
with respect to each of the plurality of second pixel groups, calculate second residual values representing differences between the pixel values of the multiple pixels included in the corresponding pixel group and the second representative pixel value of the corresponding pixel group; and
generate the third compressed data, based on the calculated second residual values of each of the plurality of second pixel groups.

17. The camera module of claim 15, wherein the first compressor is further configured to:
divide the plurality of pixels into the plurality of first pixel groups disposed adjacent to each other and respectively comprising pixels having same color information; and
with respect to each of the plurality of first pixel groups into which the plurality of pixels is divided:
calculate an average value of the pixel values of the multiple pixels included in the corresponding pixel group; and determine the calculated average value as the representative pixel value of the corresponding pixel group.

18. The camera module of claim 15, wherein the first compressor is further configured to:
   with respect to each of the plurality of first pixel groups into which the plurality of pixels is divided, determine a predicted value of the corresponding pixel group, based on any one or any combination of pixel values of pixels included in a pixel group that is compressed before the corresponding pixel group; and
   generate the first compressed data, based on the determined predicted value of each of the plurality of first pixel groups and target pixel values.

19. The camera module of claim 18, wherein the first compressor is further configured to, with respect to each of the plurality of first pixel groups into which the plurality of pixels is divided, determine a representative pixel value of the pixel group compressed before the corresponding pixel group, as the predicted value of the corresponding pixel group.

20. The camera module of claim 15, wherein the interface is further configured to:
   based on receiving a request for an image having a first resolution, output the generated third compressed data;
   based on receiving a request for an image having a second resolution higher than the first resolution, output the generated second compressed data, and the generated third compressed data; and
   based on receiving a request for an image having a third resolution higher than the second resolution, output the generated first compressed data, the generated second compressed data, and the generated third compressed data.

* * * * *